(12) United States Patent
Yasui et al.

(10) Patent No.: US 12,464,044 B2
(45) Date of Patent: Nov. 4, 2025

(54) COMMUNICATION SYSTEM, FIRST COMMUNICATION APPARATUS, SECOND COMMUNICATION APPARATUS, PROCESSING SYSTEM, AND PROCESSING APPARATUS

(71) Applicant: MegaChips Corporation, Osaka (JP)

(72) Inventors: Motoaki Yasui, Osaka (JP); Hirotaka Ono, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 205 days.

(21) Appl. No.: 18/187,673

(22) Filed: Mar. 22, 2023

(65) Prior Publication Data

US 2023/0379383 A1 Nov. 23, 2023

(30) Foreign Application Priority Data

May 23, 2022 (JP) .................................. 2022-083710

(51) Int. Cl.
*H04L 67/12* (2022.01)
*H04B 3/54* (2006.01)
*H04L 47/28* (2022.01)

(52) U.S. Cl.
CPC ............. *H04L 67/12* (2013.01); *H04B 3/544* (2013.01); *H04L 47/28* (2013.01)

(58) Field of Classification Search
CPC .................................. H04L 67/12; H04W 4/38
See application file for complete search history.

(56) References Cited

U.S. PATENT DOCUMENTS 11,082,197 B2 * 8/2021 Yoneda ................... H04L 45/24
2011/0289133 A1 * 11/2011 Shikano .................. H04L 67/12
                                                        709/202

(Continued)

FOREIGN PATENT DOCUMENTS

EP        3 809 647 A1    4/2021
JP       2002-41129 A    2/2002

(Continued)

OTHER PUBLICATIONS

Extended European Search Report issued Nov. 2, 2023 in corresponding European Patent Application No. 23163025.2, 8 pages.

(Continued)

*Primary Examiner* — Bryan Y Lee
(74) *Attorney, Agent, or Firm* — XSENSUS LLP

(57) ABSTRACT

A communication system includes a first communication apparatus communicating with a processing apparatus and a second communication apparatus performing an obtainment/transmission procedure of obtaining sensor information from a sensor unit and transmitting the sensor information to the first communication apparatus. The sensor unit includes at least one sensor. The first communication apparatus transmits the sensor information from the second communication apparatus to the processing apparatus, in response to an obtainment wish timing with which the processing apparatus wishes to obtain the sensor information. The second communication apparatus determines a start timing to start the obtainment/transmission procedure, based on a first time required to communicate between the first and second communication apparatuses when the second communication apparatus transmits the sensor information to the first communication apparatus.

22 Claims, 20 Drawing Sheets

(56) References Cited

U.S. PATENT DOCUMENTS

2018/0287664 A1* 10/2018 Laifenfeld .............. H04L 67/12
2019/0173772 A1*  6/2019 Hamachi ............. H04L 43/0817
2023/0100731 A1*  3/2023 Nam ........................ H04B 1/44
                                                     343/700 R

FOREIGN PATENT DOCUMENTS

| JP | 2005-341764 A | 12/2005 |
| JP | 2019-020756 A | 2/2019 |
| WO | 2017/199399 A1 | 11/2017 |

OTHER PUBLICATIONS

Japanese Office Action issued Nov. 19, 2024, in corresponding Japanese Patent Application No. JP 2022-083710, 10pp.

* cited by examiner

F I G. 1
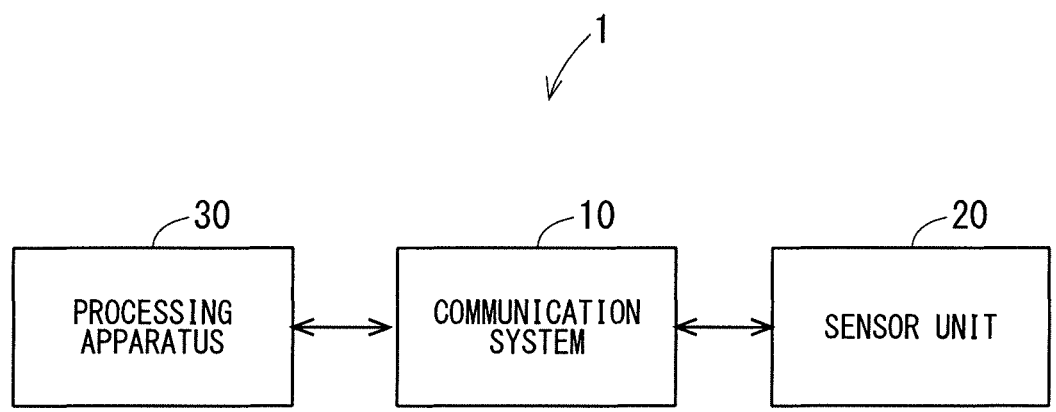

F I G. 5
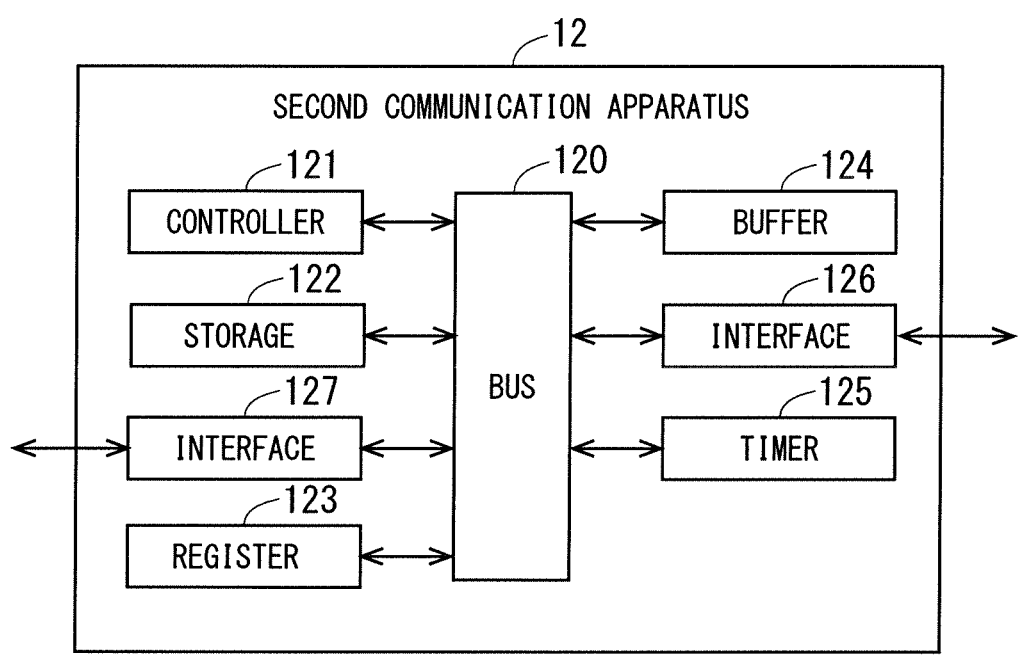

F I G. 8
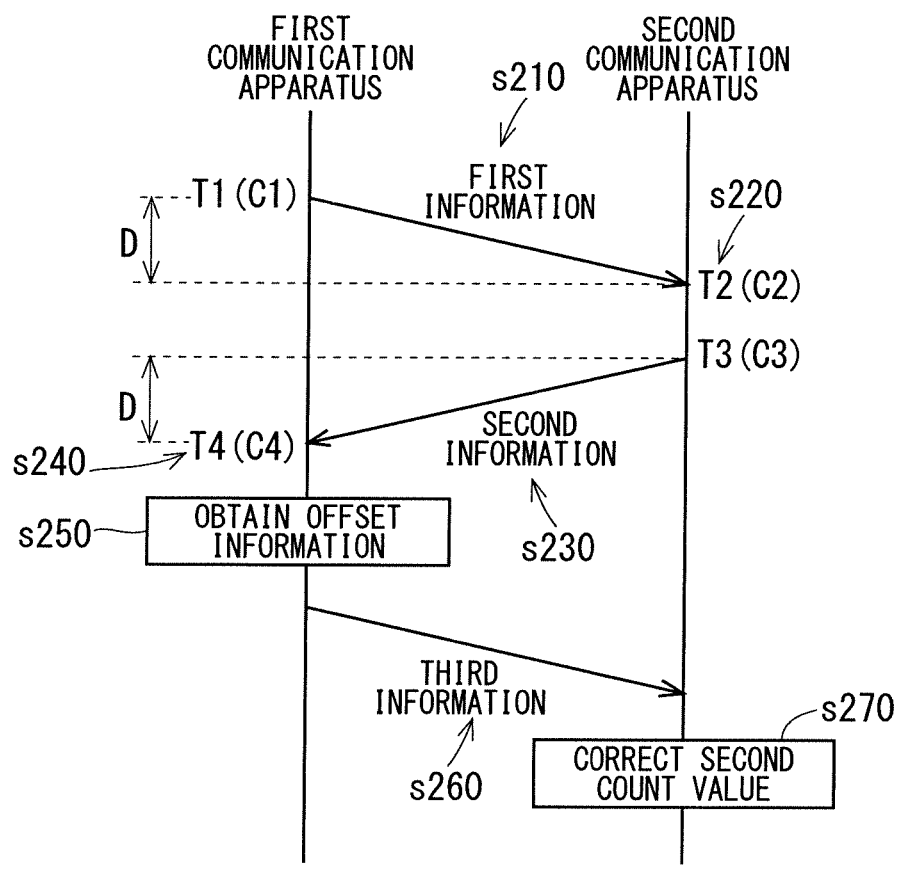

F I G. 1 2

|  |  | PROCESS CONGESTION DEGREE IN CONTROLLER | | |
|---|---|---|---|---|
|  |  | HIGH | MIDDLE | LOW |
| BUS CONGESTION DEGREE | HIGH | 1.6 | 1.3 | 1 ← b1 |
|  | MIDDLE | 1.3 | 1 | 0.7 ← b1 |
|  | LOW | 1 | 0.7 | 0.4 ← b1 |

B1

F I G. 1 3

| | | PROCESS CONGESTION DEGREE IN CONTROLLER | | |
| --- | --- | --- | --- | --- |
| | | HIGH | MIDDLE | LOW |
| BUS CONGESTION DEGREE | HIGH | $3\sigma$ | $1.5\sigma$ | 0 ← b2 |
| | MIDDLE | $1.5\sigma$ | 0 | $-1.5\sigma$ ← b2 |
| | LOW | 0 | $-1.5\sigma$ | $-3\sigma$ ← b2 |

B2

F I G. 1 4

| | | DATA VOLUME OF SENSOR INFORMATION | PROCESS CONGESTION DEGREE IN CONTROLLER | | |
|---|---|---|---|---|---|
| | | | HIGH | MIDDLE | LOW |
| BUS CONGESTION DEGREE | HIGH | LARGE | 1.6 | 1.4 | 1.2 ←—b3 |
| | | MIDDLE | 1.4 | 1.2 | 1 |
| | | SMALL | 1.2 | 1 | 0.8 ←—b3 |
| | MIDDLE | LARGE | 1.4 | 1.2 | 1 |
| | | MIDDLE | 1.2 | 1 | 0.8 ←—b3 |
| | | SMALL | 1 | 0.8 | 0.6 |
| | LOW | LARGE | 1.2 | 1 | 0.8 ←—b3 |
| | | MIDDLE | 1 | 0.8 | 0.6 |
| | | SMALL | 0.8 | 0.6 | 0.4 ←—b3 |

| | | DATA VOLUME OF SENSOR INFORMATION | PROCESS CONGESTION DEGREE IN CONTROLLER (B4) | | |
|---|---|---|---|---|---|
| | | | HIGH | MIDDLE | LOW |
| BUS CONGESTION DEGREE | HIGH | LARGE | $3\sigma$ | $2\sigma$ | $\sigma$ ← b4 |
| | | MIDDLE | $2\sigma$ | $\sigma$ | 0 |
| | | SMALL | $\sigma$ | 0 | $-\sigma$ ← b4 |
| | MIDDLE | LARGE | $2\sigma$ | $\sigma$ | 0 |
| | | MIDDLE | $\sigma$ | 0 | $-\sigma$ ← b4 |
| | | SMALL | 0 | $-\sigma$ | $-2\sigma$ |
| | LOW | LARGE | $\sigma$ | 0 | $-\sigma$ ← b4 |
| | | MIDDLE | 0 | $-\sigma$ | $-2\sigma$ |
| | | SMALL | $-\sigma$ | $-2\sigma$ | $-3\sigma$ ← b4 |

F I G. 1 8
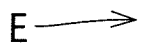

COMMUNICATION SYSTEM, FIRST COMMUNICATION APPARATUS, SECOND COMMUNICATION APPARATUS, PROCESSING SYSTEM, AND PROCESSING APPARATUS

CROSS-REFERENCE TO RELATED APPLICATION

The present application is based on, and claims priority from Japanese Patent Application Serial Number 2022-083710 filed May 23, 2022, the disclosure of which is hereby incorporated by reference herein in its entirety.

BACKGROUND OF THE INVENTION

Field of the Invention

The present disclosure relates to a technology for transmitting sensor information.

Description of the Background Art

Japanese Patent Application Laid-Open No. 2019-20756 discloses a technology for processing a sensor signal.

SUMMARY

An aspect of a communication system includes a first communication apparatus configured to communicate with a processing apparatus and a second communication apparatus configured to perform an obtainment/transmission procedure of obtaining sensor information from a sensor unit and transmitting the sensor information to the first communication apparatus. The sensor unit including at least one sensor. The first communication apparatus transmits the sensor information from the second communication apparatus to the processing apparatus, in response to an obtainment wish timing with which the processing apparatus wishes to obtain the sensor information. The second communication apparatus determines a start timing to start the obtainment/transmission procedure, based on a first time required to communicate between the first communication apparatus and the second communication apparatus when the second communication apparatus transmits the sensor information to the first communication apparatus.

An aspect of a first communication apparatus is the first communication apparatus included in the communication system.

An aspect of a second communication apparatus is the second communication apparatus included in the communication system.

A processing system according to a first aspect includes: the communication system; and a processing apparatus configured to receive the sensor information from the communication system.

A processing system according to a second aspect is the processing system according to the first aspect, wherein the obtainment wish timing arrives a plurality of times. In the processing system according to the second aspect, the first communication apparatus transmits the sensor information, and an elapsed time from a time at which the first communication apparatus has obtained the sensor information to a time at which the first communication apparatus transmits the sensor information to the processing apparatus or to the obtainment wish timing, to the processing apparatus in response to the obtainment wish timing. The processing apparatus estimates the sensor information obtained at a predetermined time by the sensor unit, based on the sensor information and the elapsed time that are transmitted from the first communication apparatus a plurality of times.

An aspect of a processing apparatus is the processing apparatus included in the processing system according to the second aspect.

BRIEF DESCRIPTION OF THE DRAWINGS

FIG. 1 schematically illustrates an example processing system;

FIG. 5 schematically illustrates an example second communication apparatus;

FIG. 8 schematically illustrates an example synchronization procedure;

FIG. 12 schematically illustrate example parameters;

FIG. 13 schematically illustrate example parameters;

FIG. 14 schematically illustrate example parameters;

FIG. 15 schematically illustrate example parameters;

FIG. 18 schematically illustrate example parameters;

DESCRIPTION OF THE PREFERRED EMBODIMENTS

FIG. 1 schematically illustrates an example of a processing system 1. As illustrated in FIG. 1, the processing system 1 includes, for example, a communication system 10, a sensor unit 20 including at least one sensor, and a processing apparatus 30. The communication system 10 obtains sensor information from the sensor unit 20. The sensor information is information indicating a detection result of the sensor unit 20. The communication system 10 transmits the obtained sensor information to the processing apparatus 30 with the timing corresponding to the timing with which the processing apparatus 30 wishes to obtain the sensor information (also referred to as an obtainment wish timing). The processing apparatus 30 executes a process based on the sensor information received from the communication system 10. The communication system 10 may include one apparatus or a plurality of apparatuses. The processing system 1 need not include the sensor unit 20.

Figure 2:
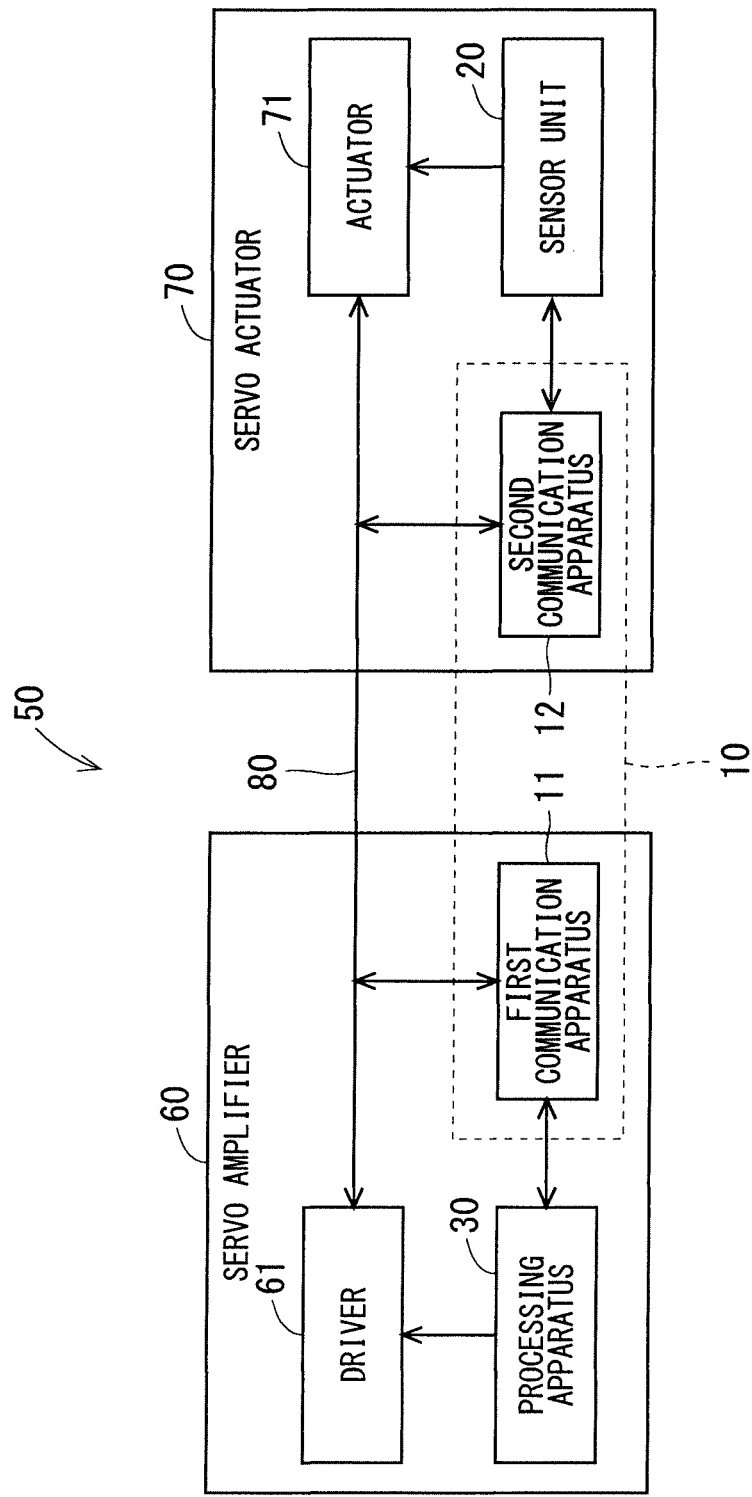
FIG. 2 schematically illustrates an example servo system.

The processing system 1 can be used in various applications. The processing system 1 may be used in, for example, a servo system 50 that controls an actuator 71. FIG. 2 schematically illustrates an example of the servo system 50 including the processing system 1. The servo system 50 can detect a state of the actuator 71, and provide, based on the detection result, feedback control of the state of the actuator 71.

As illustrated in FIG. 2, the servo system 50 includes, for example, a servo amplifier 60, a servo actuator 70, and a cable 80 that electrically connects the servo amplifier 60 to the servo actuator 70. The servo actuator 70 includes the actuator 71. The actuator 71 is, for example, a motor. The servo amplifier 60 can drive the actuator 71. Furthermore, the servo amplifier 60 can control a state of the actuator 71. Hereinafter, the actuator 71 that is a motor may be referred to as a motor 71.

The communication system 10 included in the processing system 1 includes, for example, a first communication apparatus 11 and a second communication apparatus 12 that can communicate with each other. The first communication apparatus 11 can communicate with the processing apparatus 30. The second communication apparatus 12 obtains the sensor information from the sensor unit 20, and transmits the sensor information to the first communication apparatus 11. The first communication apparatus 11 transmits the sensor information received from the second communication apparatus 12 to the processing apparatus 30 in response to the obtainment wish timing of the processing apparatus 30.

The servo amplifier 60 includes, for example, a driver 61 that drives the actuator 71, and the processing apparatus 30 and the first communication apparatus 11 of the processing system 1. The processing apparatus 30 can control the driver 61. The actuator 71 is, for example, a three-phase motor. The driver 61 is, for example, an inverter, and can provide the motor 71 with three-phase electrical supplies and drive the motor 71. The processing apparatus 30 functions as, for example, a control device that controls the actuator 71 through the driver 61. The driver 61 and the actuator 71 are electrically connected to each other through the cable 80. The cable 80 includes three electric power lines (i.e., three power supply lines) through which the three-phase electrical supplies output from the driver 61 are transmitted to the actuator 71. The cable 80 is also a power cable or an electrical supply cable.

Besides the actuator 71, the servo actuator 70 includes, for example, the sensor unit 20 and the second communication apparatus 12 of the processing system 1. The sensor unit 20 includes, for example, a rotary encoder that detects a rotational position of the motor 71. The sensor unit 20 can output sensor information including rotational position data indicating the rotational position of the motor 71. The motor 71 may be used for, for example, driving a robot, driving a belt conveyer, or other applications.

The first communication apparatus 11 and the second communication apparatus 12 can, for example, perform power-line communication (PLC) with each other through the cable 80. A communication scheme between the first communication apparatus 11 and the second communication apparatus 12 is, for example, High Definition Power Line Communication (HD-PLC). For example, the first communication apparatus 11 may function as a master, and the second communication apparatus 12 may function as a slave.

The second communication apparatus 12 superimposes the sensor information obtained from the sensor unit 20 on the cable 80, and transmits the sensor information to the first communication apparatus 11. The first communication apparatus 11 and the second communication apparatus 12 can, for example, provide differential communications with each other. The first communication apparatus 11 superimposes differential signals on two of the three electric power lines included in the cable 80, and transmits the differential signals to the second communication apparatus 12. Similarly, the second communication apparatus 12 superimposes differential signals on two of the three electric power lines included in the cable 80, and transmits the differential signals to the first communication apparatus 11.

The communication scheme between the first communication apparatus 11 and the second communication apparatus 12 may be PLC other than the HD-PLC. Furthermore, the communication scheme between the first communication apparatus 11 and the second communication apparatus 12 is not limited to the PLC and the differential communications.

The processing apparatus 30, for example, controls the motor 71 through the driver 61 based on the sensor information received from the first communication apparatus 11. For example, the processing apparatus 30 may control the motor 71 based on the rotational position data included in the sensor information (also referred to as a sensor value) so that the rotational position or the rotational velocity of the motor 71 reaches a target value.

As such, the sensor information is superimposed on the cable 80 through which the electrical supplies are transmitted to the actuator 71, and is transmitted in the servo system 50. Thus, there is no need to provide another cable for transmitting the sensor information besides the cable 80. Since this reduces the number of cables to be used in the servo system 50, the servo system 50 can be low priced, and reduce the risk of a break in the cables. Since this reduces the number of cables, this can reduce weight of a mechanism including a robot in which the cables are installed.

The sensor unit 20 may include a sensor except the rotary encoder. The sensor unit 20 may include, for example, a torque sensor that detects torque of the motor 71. In this case, the sensor information includes torque data indicating the torque of the motor 71 (also referred to as a sensor value). Furthermore, the sensor unit 20 may include a current sensor that detects a current flowing through the motor 71. In this case, the sensor information includes current data indicating the current of the motor 71 (also referred to as a sensor value). For example, the processing apparatus 30 may control the motor 71 based on the torque data and the current data included in the sensor information from the first communication apparatus 11 so that the torque of the motor 71 reaches target values. Furthermore, the sensor unit 20 may include a vibration sensor that detects vibration of the motor 71. In this case, the sensor information includes vibration data indicating the vibration of the motor 71 (also referred to as a sensor value). The processing apparatus 30 may determine a failure in the motor 71, based on the vibration data included in the sensor information from the first communication apparatus 11.

The actuator 71 may be different from the motor. For example, the actuator 71 may be a hydraulic actuator, a pneumatic actuator, or an electric actuator in which no motor is used.

Example Configuration of Processing Apparatus

Figure 3:
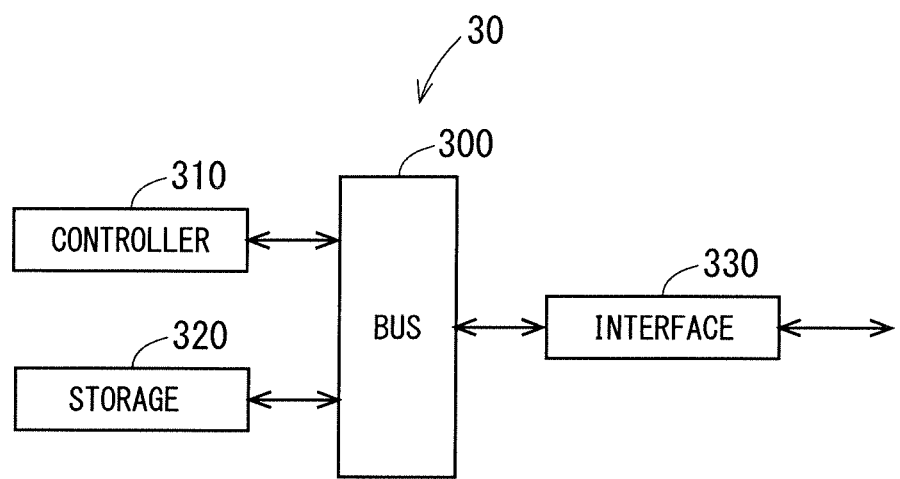
FIG. 3 schematically illustrates an example processing apparatus.

FIG. 3 schematically illustrates an example configuration of the processing apparatus 30. As illustrated in FIG. 3, the processing apparatus 30 includes, for example, a controller 310, a storage 320, and an interface 330. These constituent elements are electrically connected to a bus 300. The processing apparatus 30 is also, for example, a processing circuit. The processing apparatus 30 is, for example, a sort of computer equipment. The processing apparatus 30 is also, for example, circuitry.

The interface 330 can communicate with the first communication apparatus 11. The interface 330 is also, for example, an interface circuit. Furthermore, the interface 330 is also, for example, a communication unit or a communication circuit. The interface 330 may perform wired communication or wireless communication with the first communication apparatus 11.

The controller 310 controls other constituent elements of the processing apparatus 30 through the bus 300. Consequently, the controller 310 can manage overall operations of the processing apparatus 30. The controller 310 is also, for example, a control circuit. The controller 310 includes, for example, at least one processor. Examples of the at least one processor include a central processing unit (CPU).

The storage 320 may include a non-transitory recording medium that can be read by a CPU of the controller 310, such as a read-only memory (ROM) and a random-access memory (RAM). The storage 320 stores, for example, a program for controlling the processing apparatus 30. For example, the CPU of the controller 310 executes programs in the storage 320 to achieve various functions of the controller 310.

When the processing apparatus 30 transmits transmission-target information to the first communication apparatus 11, the controller 310 outputs the transmission-target information to the interface 330. The interface 330 generates a transmission signal including the received transmission-target information, and transmits the generated transmission signal. When the processing apparatus 30 receives a signal transmitted by the first communication apparatus 11, the interface 330 receives the signal. Then, the interface 330 obtains, from a reception signal that is the received signal, information included in the reception signal, and outputs the information to the controller 310 through the bus 300. Consequently, the controller 310 can obtain the information transmitted by the first communication apparatus 11.

The configuration of the controller 310 is not limited to the examples above. For example, the controller 310 may include a plurality of CPUs. Furthermore, the controller 310 may include at least one digital signal processor (DSP). All or a part of the functions of the controller 310 may be implemented by a hardware circuit that does not require software for implementing the functions. The storage 320 may include a non-transitory computer-readable recording medium other than the ROM and the RAM.

Example Configuration of First Communication Apparatus

Figure 4:
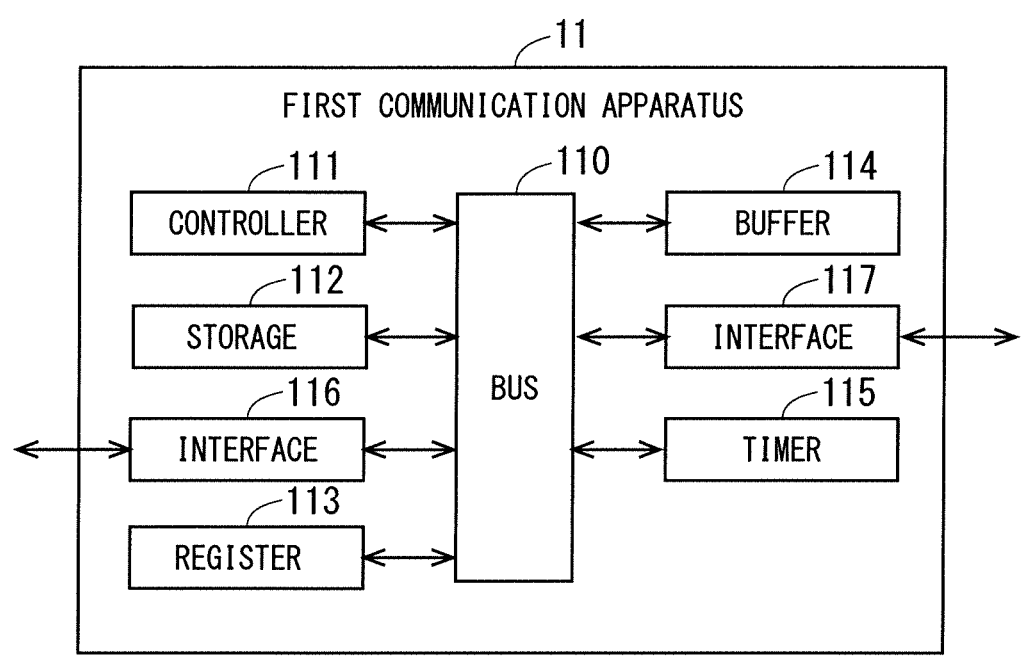
FIG. 4 schematically illustrates an example first communication apparatus.

FIG. 4 schematically illustrates an example configuration of the first communication apparatus 11. As illustrated in FIG. 4, the first communication apparatus 11 includes, for example, a controller 111, a storage 112, a register 113, a buffer 114, a timer 115, and interfaces 116 and 117. These constituent elements are electrically connected to a bus 110. The first communication apparatus 11 is also, for example, a communication circuit. The first communication apparatus 11 is, for example, a sort of computer equipment. The first communication apparatus 11 is also, for example, circuitry.

The interface 116 can communicate with the interface 330 of the processing apparatus 30. The interface 116 is also, for example, an interface circuit. Furthermore, the interface 116 is also, for example, a communication unit or a communication circuit.

The interface 117 can perform power-line communication with the second communication apparatus 12 through the cable 80. The interface 117 is also, for example, an interface circuit. Furthermore, the interface 117 is also, for example, a communication unit or a communication circuit. The interface 117 also includes, for example, a coupling circuit connected to the cable 80.

The controller 111 controls other constituent elements of the first communication apparatus 11 through the bus 110. Consequently, the controller 111 can manage overall operations of the first communication apparatus 11. The controller 111 is also, for example, a control circuit. The controller 111 includes, for example, at least one processor. Examples of the at least one processor include a CPU.

The storage 112 may include a non-transitory recording medium that can be read by a CPU of the controller 111, such as a ROM and a RAM. The storage 112 stores, for example, a program for controlling the first communication apparatus 11. For example, the CPU of the controller 111 executes programs in the storage 112 to achieve various functions of the controller 111.

When the first communication apparatus 11 transmits transmission-target information to the processing apparatus 30, the controller 111 outputs the transmission-target information to the interface 116. The interface 116 generates a transmission signal including the received transmission-target information, and transmits the generated transmission signal. When the first communication apparatus 11 receives a signal transmitted by the processing apparatus 30, the interface 116 receives the signal. Then, the interface 116 obtains, from a reception signal that is the received signal, information included in the reception signal, and outputs the information to the controller 111 through the bus 110. Consequently, the controller 111 can obtain the information transmitted by the processing apparatus 30.

When the first communication apparatus 11 transmits transmission-target information to the second communication apparatus 12, the controller 111 outputs the transmission-target information to the interface 117. The interface 117 generates a transmission signal including the received transmission-target information. Here, the interface 117 performs, for example, a modulating process using the transmission-target information. Then, the interface 117 converts the generated transmission signal into a differential format, superimposes the transmission signal of the differential format (i.e., a differential signal) on the cable 80, and transmits the transmission signal to the second communication apparatus 12. When the first communication apparatus 11 receives a signal transmitted by the second communication apparatus 12, the interface 117 receives the signal through the cable 80. Then, the interface 117 converts a reception signal that is the received signal into a single-ended format, performs, for example, a demodulation process on the reception signal of the single-ended format, and obtains, from the reception signal, information included in the reception signal. Then, the interface 117 outputs the obtained information to the controller 111 through the bus 110. Consequently, the controller 111 can obtain the information transmitted by the second communication apparatus 12.

The configuration of the controller 111 is not limited to the examples above. For example, the controller 111 may include a plurality of CPUs. Furthermore, the controller 111 may include at least one DSP. All or a part of the functions of the controller 111 may be implemented by a hardware circuit that does not require software for implementing the functions. The storage 112 may include a non-transitory computer-readable recording medium other than the ROM and the RAM.

The register 113 stores setting information transmitted by the processing apparatus 30 to the first communication apparatus 11. The setting information is information for configuring operations of the communication system 10. The setting information will be described below in detail. The register 113 is also a storage or a storage circuit. The controller 111 stores the setting information received by the interface 116 in the register 113 through the bus 110. Furthermore, the controller 111 can read the setting information from the register 113 through the bus 110.

The buffer 114 stores the sensor information transmitted by the second communication apparatus 12. The buffer 114 is also a storage or a storage circuit. The controller 111 stores the sensor information received by the interface 117 in the buffer 114 through the bus 110. Furthermore, the controller 111 can read the sensor information from the buffer 114 through the bus 110.

The timer 115 can measure the current time. The timer 115 increments a count value at regular intervals (e.g., nanoseconds or microseconds). The count value counted by the timer 115 indicates the current time. The timer 115 is also a measurement circuit that measures the current time. The controller 111 can obtain the current count value from the timer 115 through the bus 110. Consequently, the controller 111 can recognize the current time managed in the first communication apparatus 11.

Example Configuration of Second Communication Apparatus

FIG. 5 schematically illustrates an example configuration of the second communication apparatus 12. As illustrated in FIG. 5, the second communication apparatus 12 includes, for example, a controller 121, a storage 122, a register 123, a buffer 124, a timer 125, and interfaces 126 and 127. These constituent elements are electrically connected to a bus 120. The second communication apparatus 12 is also, for example, a communication circuit. The second communication apparatus 12 is, for example, a sort of computer equipment. The second communication apparatus 12 is also, for example, circuitry.

The interface 126 can communicate with the sensor unit 20. The interface 126 is also, for example, an interface circuit. Furthermore, the interface 126 is also, for example, a communication unit or a communication circuit. The interface 126 obtains the sensor information from the sensor unit 20 according to an instruction of the controller 121.

The interface 127 can perform power-line communication with the first communication apparatus 11 through the cable 80. The interface 127 is also, for example, an interface circuit. Furthermore, the interface 127 is also, for example, a communication unit or a communication circuit. The interface 127 also includes, for example, a coupling circuit connected to the cable 80.

The controller 121 controls other constituent elements of the second communication apparatus 12 through the bus 120. Consequently, the controller 121 can manage overall operations of the second communication apparatus 12. The controller 121 is also, for example, a control circuit. The controller 121 includes, for example, at least one processor. Examples of the at least one processor include a CPU.

The storage 122 may include a non-transitory recording medium that can be read by a CPU of the controller 121, such as a ROM and a RAM. The storage 122 stores, for example, a program for controlling the second communication apparatus 12. For example, the CPU of the controller 121 executes programs in the storage 122 to achieve various functions of the controller 121.

When the second communication apparatus 12 transmits transmission-target information to the first communication apparatus 11, the controller 121 outputs the transmission-target information to the interface 127. The interface 127 generates a transmission signal including the received transmission-target information. Here, the interface 127 performs, for example, a modulating process using the transmission-target information. Then, the interface 127 converts the generated transmission signal into a differential format, superimposes the transmission signal of the differential format on the cable 80, and transmits the transmission signal to the first communication apparatus 11. When the second communication apparatus 12 receives a signal transmitted by the first communication apparatus 11, the interface 127 receives the signal through the cable 80. Then, the interface 127 converts a reception signal that is the received signal into a single-ended format, performs, for example, a demodulation process on the reception signal of the single-ended format, and obtains, from the reception signal, information included in the reception signal. Then, the interface 127 outputs the obtained information to the controller 121 through the bus 120. Consequently, the controller 121 can obtain the information transmitted by the first communication apparatus 11.

The configuration of the controller 121 is not limited to the examples above. For example, the controller 121 may include a plurality of CPUs. Furthermore, the controller 121 may include at least one DSP. All or a part of the functions of the controller 121 may be implemented by a hardware circuit that does not require software for implementing the functions. The storage 122 may include a non-transitory computer-readable recording medium other than the ROM and the RAM.

The register 123 stores setting information transmitted by the first communication apparatus 11 to the second communication apparatus 12. The register 123 is also a storage or a storage circuit. The controller 121 stores the setting information received by the interface 127 in the register 123 through the bus 120. Furthermore, the controller 121 can read the setting information from the register 123 through the bus 120.

The buffer 124 stores the sensor information obtained by the interface 126 from the sensor unit 20. The buffer 124 is also a storage or a storage circuit. The controller 121 stores the sensor information obtained by the interface 126 in the buffer 124 through the bus 120. Furthermore, the controller 121 can read the sensor information from the buffer 124 through the bus 120.

The timer 125 can measure the current time. The timer 125 increments a count value at regular intervals (e.g., nanoseconds or microseconds). The count value counted by the timer 125 indicates the current time. The controller 121 can obtain the current count value from the timer 125 through the bus 120. Consequently, the controller 121 can recognize the current time managed in the second communication apparatus 12. Count-up intervals of the timer 125 are identical to those of the timer 115.

A count value to be counted by the timer 125 of the second communication apparatus 12 may be hereinafter referred to as a second count value. Furthermore, a count value to be counted by the timer 115 of the first communication apparatus 11 may be referred to as a first count value.

A procedure in which the first communication apparatus 11 transmits a signal and the second communication apparatus 12 receives the signal will be referred to as downlink communication for convenience of the description. Furthermore, a procedure in which the second communication apparatus 12 transmits a signal and the first communication apparatus 11 receives the signal may be referred to as uplink communication. Furthermore, the first communication apparatus 11 and the second communication apparatus 12 which need not be particularly distinguished from one another will be simply referred to as communication apparatuses.

Example Operations of Processing System

The communication system 10 obtains the sensor information from the sensor unit 20 in advance in response to the obtainment wish timing of the processing apparatus 30. The communication system 10 transmits the sensor information obtained in advance to the processing apparatus 30 in response to the obtainment wish timing. This enables the processing apparatus 30 to obtain the sensor information obtained with the timing closer to the obtainment wish timing, with the timing closer to the obtainment wish timing.

When the processing apparatus 30 wishes to obtain the sensor information, the processing apparatus 30 transmits, to the communication system 10, for example, obtainment request information indicating a request for obtaining the sensor information. The obtainment request information is information indicating that the processing apparatus 30 wishes to obtain the sensor information. Upon receipt of the obtainment request information, the communication system 10 can recognize that the processing apparatus 30 wishes to obtain the sensor information. The communication system 10, for example, determines the timing with which the obtainment request information is received (also referred to as an obtainment request reception timing) as the timing with which the processing apparatus 30 wishes to obtain the sensor information (i.e., the obtainment wish timing). Upon receipt of the obtainment request information, the communication system 10 transmits the sensor information to the processing apparatus 30. When the processing apparatus 30 transmits the obtainment request information, the communication system 10 obtains the sensor information from the sensor unit 20 in advance in response to the obtainment request reception timing, and transmits the sensor information obtained in advance to the processing apparatus 30 in response to the obtainment request reception timing.

After executing an initial setting according to an instruction of the processing apparatus 30, the communication system 10 starts sensor processing of repeatedly obtaining the sensor information and transmitting pieces of the sensor information to the processing apparatus 30, according to the instruction of the processing apparatus 30. During the sensor processing, the processing apparatus 30, for example, repeatedly transmits the obtainment request information to the communication system 10. In the sensor processing, the communication system 10 repeatedly obtains the sensor information, and transmits the obtained sensor information to the processing apparatus 30 each time it receives the obtainment request information.

Figure 6:
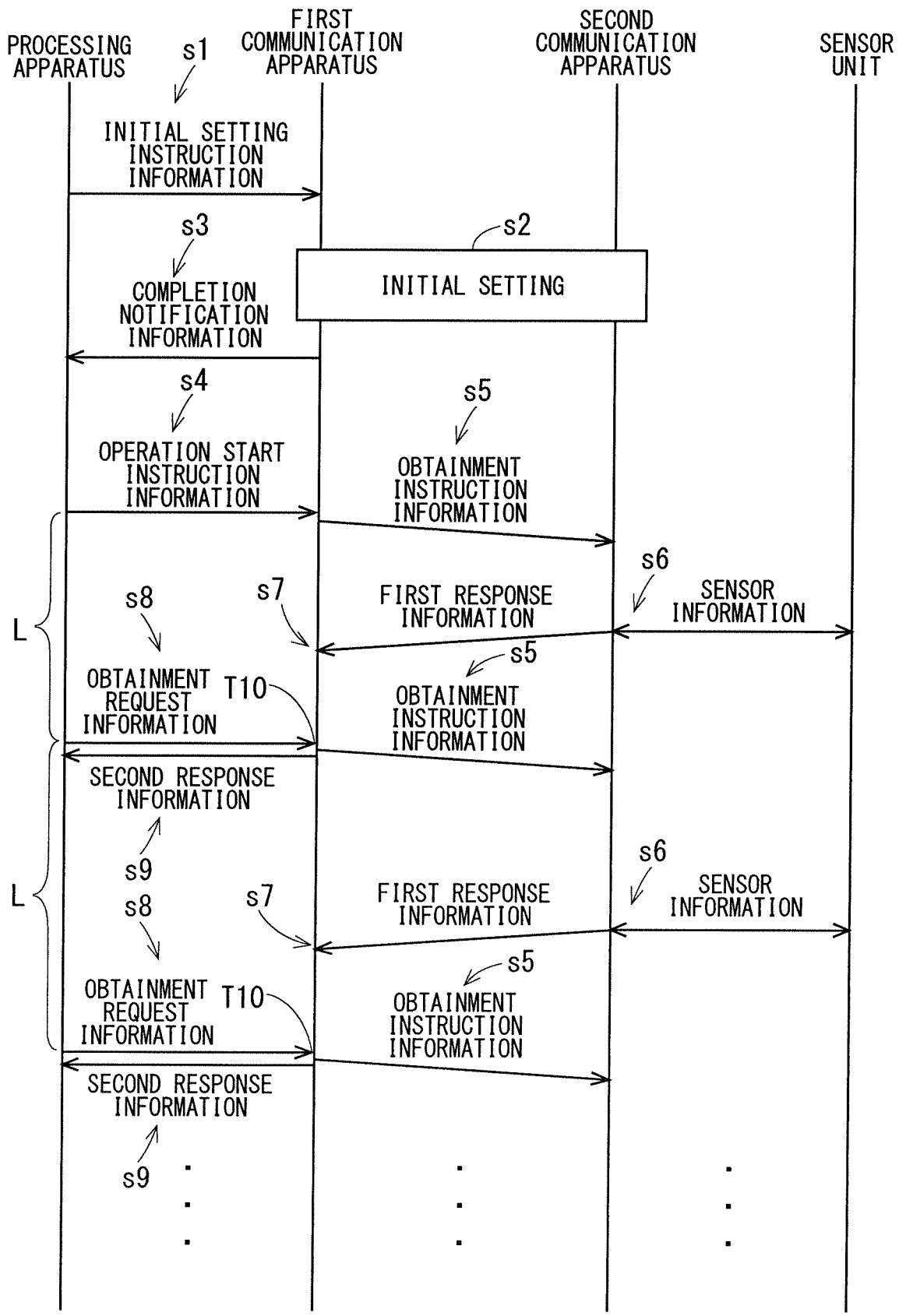
FIG. 6 schematically illustrates example operations of the processing system.

FIG. 6 schematically illustrates example operations of the processing system 1. As illustrated in FIG. 6, the processing apparatus 30 transmits, to the first communication apparatus 11 of the communication system 10, initial setting instruction information for instructing execution of the initial setting in Step s1. The initial setting instruction information includes setting information for configuring operations of the communication system 10. The communication system 10 executes the sensor processing based on the setting information. Upon receipt of the initial setting instruction information by the first communication apparatus 11, the communication system 10 executes the initial setting in Step s2.

Figure 7:
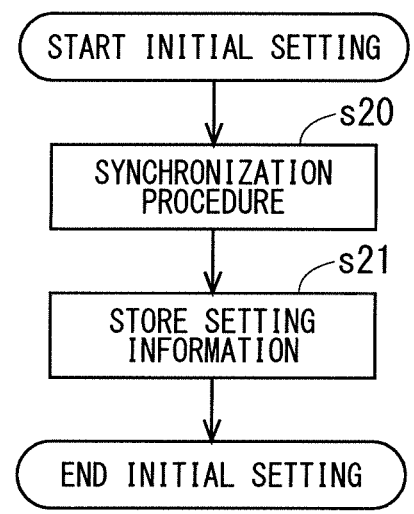
FIG. 7 schematically illustrates an example initial setting.

FIG. 7 schematically illustrates an example initial setting. Once starting the initial setting, the communication system 10 executes a synchronization procedure in Step s20. In the synchronization procedure, the time managed by the first communication apparatus 11 (also referred to as a first time) is synchronized with the time managed by the second communication apparatus 12 (also referred to as a second time).

FIG. 8 schematically illustrates an example synchronization procedure. In the synchronization procedure, the first communication apparatus 11 transmits first information to the second communication apparatus 12 in Step s210 as illustrated in FIG. 8. The first information includes time information T1 indicating a transmission time of the first information. A transmission time of certain information may be, for example, a timing with which the certain information starts to be transmitted (also referred to as a transmission start timing). The transmission start timing to start transmitting the certain information is, for example, a timing with which a transmission signal including the certain information starts to be generated. The time information T1 is, for example, the first count value (also referred to as a first downlink transmission start count value) with the timing to start transmitting the first information (i.e., the transmission time of the first information). The first downlink transmission start count value indicates the time at which the first communication apparatus 11 starts to transmit the first information.

The second communication apparatus 12 that receives the first information obtains time information T2 indicating a reception time of the first information in Step s220. The reception time of the certain information may be, for example, a timing with which reception of the certain information is completed (also referred to as a reception completion timing). The reception completion timing to complete receiving the certain information is, for example, the timing with which various processes including a demodulation process are performed on a signal including the certain information and obtainment of the certain information from this signal is completed. The time information T2 is, for example, the second count value (a first downlink reception completion count value) with the timing to complete receiving the first information (i.e., the reception time of the first information). The first downlink reception completion count value indicates the time at which the second communication apparatus 12 has completed receiving the first information.

The second communication apparatus 12 transmits second information to the first communication apparatus 11 in Step s230 after Step s220. The second information includes time information T3 indicating a transmission time of the second information, and the time information T2. The time information T3 is, for example, the second count value (also referred to as a first uplink transmission start count value) with the timing to start transmitting the second information (i.e., the transmission time of the second information). The first uplink transmission start count value indicates the time at which the second communication apparatus 12 starts to transmit the second information.

The first communication apparatus 11 that receives the second information obtains time information T4 indicating the reception time of the second information in Step s240. The time information T4 is, for example, a first count value (a first uplink reception completion count value) with the timing to complete receiving the second information (i.e., the reception time of the second information). The first uplink reception completion count value indicates the time at which the first communication apparatus 11 has completed receiving the second information.

In Step s250 after Step s240, the controller 111 of the first communication apparatus 11 finds an offset value OS indicating a difference of the second time managed by the second communication apparatus 12 from the first time managed by the first communication apparatus 11. Here, C1 denotes the first downlink transmission start count value as the time information T1. C2 denotes the first downlink reception completion count value as the time information T2. C3 denotes the first uplink transmission start count value as the time information T3. C4 denotes the first uplink reception completion count value as the time information T4. The offset value OS is represented by, for example, the following Equation (1).

$$OS=((C2-C1))-((C4-C3))/2 \qquad (1)$$

The second count value being counted by the second communication apparatus 12 is different from the first count value being counted by the first communication apparatus 11 by the offset value OS. When the second count value precedes the first count value (i.e., the second time precedes the first time), the offset value OS is a positive value. Conversely, when the second count value lags behind the first count value (i.e., the second time lags behind the first time), the offset value OS is a negative value.

The first communication apparatus 11 transmits, to the second communication apparatus 12, third information including the found offset value OS in Step s260 after Step s250. Upon receipt of the third information, the second communication apparatus 12 corrects the second count value based on the offset value OS included in the third information in Step s270. For example, the controller 121 of the second communication apparatus 12 determines a value obtained by subtracting the offset value OS from the second count value to be the corrected second count value. This makes the corrected second count value almost equal to the first count value, and synchronizes the second time with the first time. In other words, this synchronizes the second count value with the first count value. The controller 121 uses the corrected second count value in using the second count value. Unless otherwise noted, the second count value will hereinafter mean the second count value corrected using the offset value OS (i.e., the second count value synchronized with the first count value).

As illustrated in FIG. 7, the first communication apparatus 11 and the second communication apparatus 12 record the setting information included in the initial setting instruction information in Step s21 after the synchronization procedure in Step s20. In Step s21, the controller 111 of the first communication apparatus 11 stores, in the register 113, the setting information received by the interface 116. This allows the first communication apparatus 11 to record the setting information. Furthermore, the controller 111 causes the interface 117 to transmit the setting information. The controller 121 of the second communication apparatus 12 stores, in the register 123, the setting information received by the interface 127. This allows the second communication apparatus 12 to record the setting information. Recording the setting information in the first communication apparatus 11 and the second communication apparatus 12 ends the initial setting.

The setting information includes, for example, intervals L at which the processing apparatus 30 transmits the obtainment request information (also referred to as obtainment request transmission intervals L). The obtainment request transmission intervals L are, for example, regular intervals, and are also referred to as a loop cycle. The obtainment request transmission intervals L are also intervals at which the processing apparatus 30 wishes to obtain the sensor information (sensor information obtainment wish intervals). Furthermore, the setting information includes a margin time M and an uplink communication time estimated value Dux to be described later.

In Step s3 after the completion of the initial setting in Step s2, the first communication apparatus 11 transmits, to the processing apparatus 30, completion notification information indicating notification of completion of the initial setting as illustrated in FIG. 6. Upon receipt of the completion notification information, the processing apparatus 30 transmits, to the first communication apparatus 11, operation start instruction information for instructing start of the sensor processing in Step s4. Upon receipt of the operation start instruction information by the first communication apparatus 11, the communication system 10 starts the sensor processing. The processing apparatus 30 transmits the obtainment request information after the obtainment request transmission interval L since transmission of the operation start instruction information. Then, the processing apparatus 30 transmits the obtainment request information at the obtainment request transmission intervals L. Thus, the first communication apparatus 11 receives the obtainment request information at the obtainment request transmission intervals L.

Hereinafter, each of a period until which the first communication apparatus 11 receives obtainment request information after the obtainment request transmission interval L since receipt of the operation start instruction information and a period until which the first communication apparatus 11 receives the next obtainment request information after the obtainment request transmission interval L since receipt of the obtainment request information may be referred to as a unit sensor processing period. In the processing system 1, the unit sensor processing period consecutively and repeatedly appears from the timing to receive the operation start instruction information by the first communication apparatus 11. The unit sensor processing period that appears at a p-th from the timing to receive the operation start instruction information will be referred to as the p-th unit sensor processing period, where p is an integer greater than or equal to 1. The first unit sensor processing period is a period until which the first communication apparatus 11 receives the obtainment request information after the obtainment request transmission interval L since receipt of the operation start instruction information. Furthermore, a unit sensor processing period to be described (i.e., a unit sensor processing period of interest) may be referred to as a target unit sensor processing period.

Upon receipt of the operation start instruction information, the first communication apparatus 11 transmits, to the second communication apparatus 12, obtainment instruction information for instructing obtainment of the sensor information in Step s5. Upon receipt of the obtainment instruction information, the second communication apparatus 12 performs, in Step s6, an obtainment/transmission procedure of obtaining the sensor information and transmitting the sensor information to the first communication apparatus 11 in advance in response to the timing T10 to receive the obtainment request information by the first communication apparatus 11 (i.e., obtainment request reception timing T10). In the obtainment/transmission procedure in Step s6, the controller 121 first obtains the sensor information from the sensor unit 20 through the interface 126, and stores the obtained sensor information in the buffer 124. Then, the controller 121 reads the sensor information from the buffer 124, and causes the interface 127 to transmit first response information including the read sensor information.

In Step s7 after Step s6, the first communication apparatus 11 receives the first response information. Then, the controller 111 of the first communication apparatus 11 stores, in the buffer 114, the sensor information included in the first response information. Then, the processing apparatus 30 transmits the obtainment request information to the first communication apparatus 11 in Step s8. Upon receipt of the obtainment request information, the first communication apparatus 11 transmits, in Step s9, second response information including the sensor information in the buffer 114 to the processing apparatus 30. Consequently, the first communication apparatus 11 transmits the sensor information to the processing apparatus 30 with the timing corresponding to the obtainment request reception timing T10 (i.e., the obtainment wish timing). Furthermore, the first communication apparatus 11 re-executes Step s5 upon receipt of the obtainment request information to transmit the obtainment instruction information to the second communication apparatus 12. Then, the second communication apparatus 12 re-executes Step s6. Subsequently, the processing system 1 operates as previously described.

The processing apparatus 30 may transmit, to the first communication apparatus 11, operation end instruction information for instructing end of the sensor processing. Here, the first communication apparatus 11 transmits the received operation end instruction information to the second communication apparatus 12. Consequently, the communication system 10 does not obtain the sensor information, and ends the sensor processing.

Figure 9:
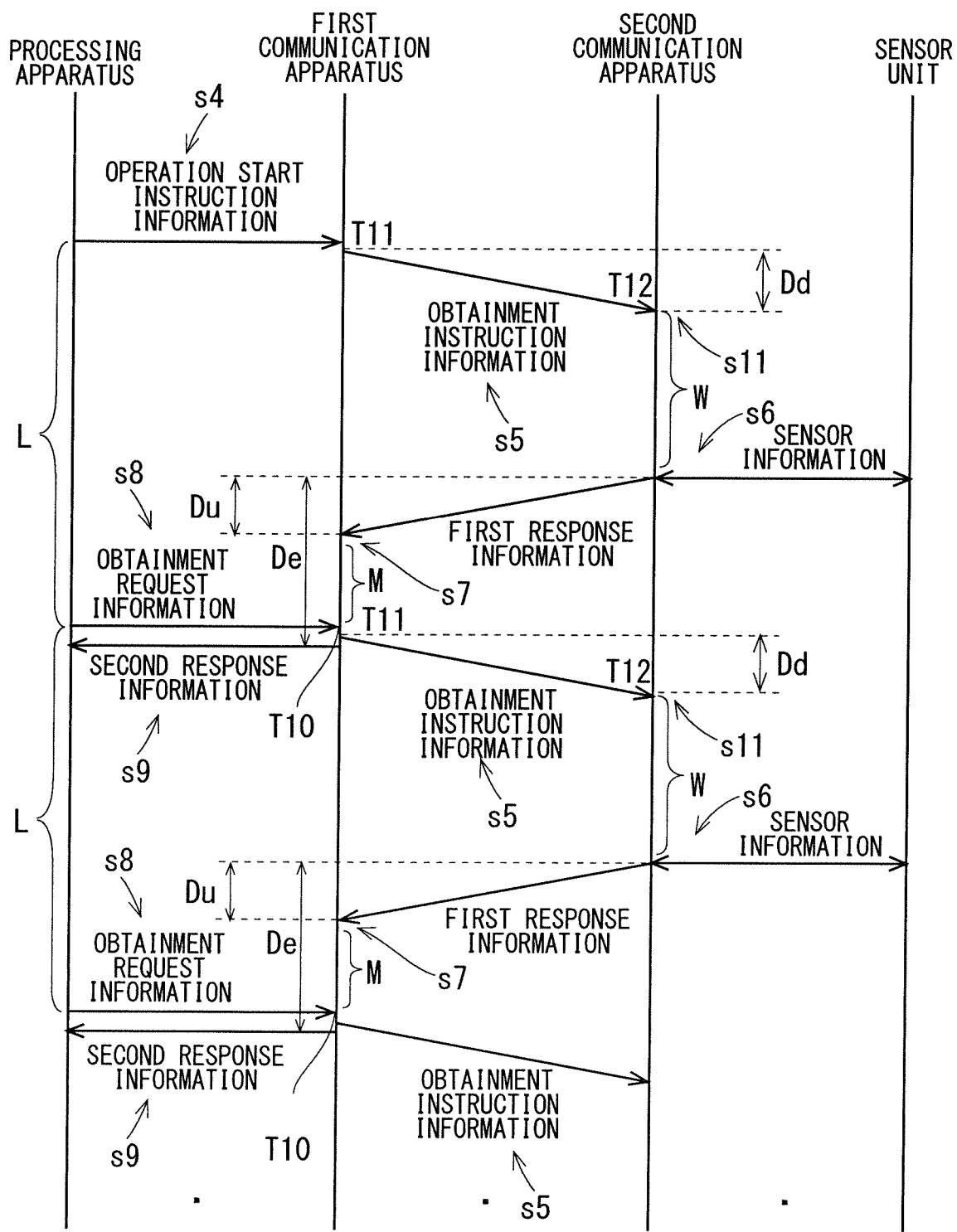
FIG. 9 schematically illustrates example operations of the processing system.

The second communication apparatus 12 determines a start timing of the obtainment/transmission procedure on the sensor information (i.e., Step s6) based on, for example, the setting information in the register 123. The start timing will be also referred to as obtainment/transmission procedure start timing, The second communication apparatus 12 starts the obtainment/transmission procedure with the obtainment/transmission procedure start timing. The obtainment/transmission procedure start timing is the timing with which the second communication apparatus 12 obtains the sensor information from the sensor unit 20 (also referred to as a sensor information obtainment timing). FIG. 9 schematically illustrates an example method for determining the obtainment/transmission procedure start timing. FIG. 9 illustrates details of the processes after Step s4 in the procedure of FIG. 6.

The obtainment instruction information to be transmitted by the first communication apparatus 11 in Step s5 includes time information T11 indicating a transmission time of the obtainment instruction information. The time information T11 is, for example, the first count value with the timing to start transmitting the obtainment instruction information (also referred to as a second downlink transmission start count value).

In Step s11 after Step s5, the second communication apparatus 12 receives the obtainment instruction information. In Step s11, the second communication apparatus 12 obtains time information T12 indicating the reception time of the obtainment instruction information. The time information T12 is, for example, the second count value with the timing to complete receiving the obtainment instruction information (a second downlink reception completion count value). In Step s11, the controller 121 of the second communication apparatus 12 determines the obtainment/transmission procedure start timing based on, for example, the time information T11 included in the obtainment instruction information received by the second communication apparatus 12, the time information T12, and the obtainment request transmission intervals L, the margin time M, and the uplink communication time estimated value Dux that are included in the setting information in the register 123. Then, the second communication apparatus 12 starts the obtainment/transmission procedure in Step s6 with the obtainment/transmission procedure start timing.

In this example, the controller 121 determines the obtainment/transmission procedure start timing so that the first communication apparatus 11 receives the first response information from the second communication apparatus 12 with the timing closer to the obtainment request reception timing T10 (i.e., the obtainment wish timing).

The uplink communication time estimated value Dux to be used for determining the obtainment/transmission procedure start timing is an estimated value of a time required for the uplink communication between the first communication apparatus 11 and the second communication apparatus 12 (hereinafter also referred to as an uplink communication time Du). The uplink communication time Du (see FIG. 9) is, for example, the time from the timing with which the second communication apparatus 12 starts to transmit information (i.e., a transmission start timing) to the timing with which the first communication apparatus 11 completes receiving the information (i.e., reception completion timing). The controller 121 determines the obtainment/transmission procedure start timing using, for example, an uplink communication time estimated value Dux of a fixed value. The uplink communication time estimated value Dux may be, for example, a design value or a value predetermined when an actual machine of the communication system 10 is used.

The actual uplink communication time Du is not fixed, and may vary, for example, according to an operation state of the first communication apparatus 11 and an operation state of the second communication apparatus 12. The margin time M accommodates the variations (also referred to as fluctuations) in the uplink communication time Du. The margin time M is, for example, a fixed value. The margin time M is, for example, set larger than or equal to a degree of variations in the uplink communication time Du. The degree of variations in the uplink communication time Du is, for example, a standard deviation of the uplink communication times Du. The margin time M may be, for example, set to a design upper limit value of the standard deviation of the uplink communication times Du. When the degree of variations in the uplink communication time Du in the communication system 10 is very small, the margin time M need not be set. In other words, the margin time M may be zero.

In this example, the time handled by the communication system 10 is represented by, for example, the number of count by each of the timers 115 and 125 (simply referred to as a count number). Thus, multiplying a count number representing a certain time by regular count-up interval of each of the timers 115 and 125 produces an actual value of the certain time. Each of the uplink communication time estimated value Dux and the margin time M that are included in the setting information is represented by a count number.

In Step s11, the controller 121 obtains an actual measured value of a time required for the downlink communication from the first communication apparatus 11 to the second communication apparatus 12 (hereinafter also referred to as a downlink communication time Dd) based on the time information T11 and the time information T12. The downlink communication time Dd is, for example, the time from the timing with which the first communication apparatus 11 starts to transmit information (i.e., a transmission start timing) to the timing with which the second communication apparatus 12 completes receiving the information (i.e., reception completion timing). The controller 121 determines, for example, a difference (i.e., a count number) obtained by subtracting the second downlink transmission start count value as the time information T11 from the second downlink reception completion count value as the time information T12 to be an actual measured value of the downlink communication time Dd (also referred to as a downlink-communication-time actual measured value Ddy).

In Step s11, the controller 121 determines a wait time W using the following Equation (2).

$$W = L - M - Ddy - Dux \quad (2)$$

After determining the wait time W, the controller 121 determines a value obtained by adding the wait time W to the second downlink reception completion count value as the time information T12 to be an obtainment/transmission procedure start count value. Then, the controller 121 determines the timing with which the second count value counted by the timer 125 is equal to the obtainment/transmission procedure start count value, to be the obtainment/transmission procedure start timing. The second communication apparatus 12 waits until the second count value is equal to the obtainment/transmission procedure start count value, and starts the obtainment/transmission procedure in Step s6 when the second count value is equal to the obtainment/transmission procedure start count value. In other words, the second communication apparatus 12 starts the obtainment/transmission procedure after waiting for the wait time W from the time when the second count value is equal to the second downlink reception completion count value. This enables the first communication apparatus 11 to receive the sensor information obtained with the timing closer to the obtainment request reception timing T10, immediately before the obtainment request reception timing T10. Thus, upon receipt of the obtainment request information, the first communication apparatus 11 can immediately transmit the sensor information obtained with the timing closer to the obtainment request reception timing T10 to the processing apparatus 30. Consequently, the processing apparatus 30 can immediately obtain the sensor information obtained with the timing closer to transmission of the obtainment request information, after transmitting the obtainment request information. In other words, the processing apparatus 30 can receive the sensor information obtained with the timing closer to the obtainment wish timing with which the processing apparatus 30 wishes to obtain the sensor information, from the communication system 10 with the timing closer to the obtainment wish timing. This enables the processing apparatus 30 to obtain the sensor information in real time and provide, based on the latest sensor information, the actuator 71 with appropriate feedback control. Since the processing apparatus 30 can obtain the sensor information immediately after transmitting the obtainment request information, the processing apparatus 30 can reduce the wait time from transmission of the obtainment request information to reception of the sensor information. In other words, the processing apparatus 30 can reduce the wait time from the timing with which the processing apparatus 30 wishes to obtain the sensor information to actual reception of the sensor information.

Furthermore, the second communication apparatus 12 determines the obtainment/transmission procedure start timing based on the uplink communication time Du. Thus, upon receipt of the obtainment request information, the first communication apparatus 11 can immediately transmit, to the processing apparatus 30, the sensor information obtained with the timing closer to the obtainment request reception timing T10. Consequently, the processing apparatus 30 can immediately obtain the sensor information obtained with the timing closer to transmission of the obtainment request information, after transmitting the obtainment request information.

Furthermore, the second communication apparatus 12 determines the obtainment/transmission procedure start timing based on a degree of variations in the uplink communication time Du. Thus, upon receipt of the obtainment request information, the first communication apparatus 11 can immediately transmit, to the processing apparatus 30, the sensor information obtained with the timing closer to the obtainment request reception timing T10. Consequently, the processing apparatus 30 can immediately obtain the sensor information obtained with the timing closer to transmission of the obtainment request information, after transmitting the obtainment request information.

The controller 121 may determine, to be an estimated reception count value indicating an estimated value of a timing with which the first communication apparatus 11 receives the obtainment request information, a value obtained by adding the obtainment request transmission interval L to the second downlink transmission start count value as the time information T11 included in the obtainment instruction information. Then, the controller 121 may determine, to be the obtainment/transmission procedure start count value, a value obtained by subtracting the margin time M and the uplink communication time estimated value Dux from the estimated reception count value. The estimated reception count value indicates an estimated value of the time at which the first communication apparatus 11 receives the obtainment request information. Furthermore, the estimated reception count value indicates the obtainment wish timing of the processing apparatus 30.

Furthermore, the processing apparatus 30 may change the obtainment request transmission intervals L. Here, the processing apparatus 30, for example, transmits the obtainment request information including the changed obtainment request transmission intervals L to the first communication apparatus 11. In Step s5, the first communication apparatus 11 transmits, to the second communication apparatus 12, the obtainment instruction information including the changed obtainment request transmission intervals L included in the received obtainment request information. In Step s11, the second communication apparatus 12 determines the obtainment/transmission procedure start timing using the changed obtainment request transmission intervals L included in the received obtainment instruction information. The processing apparatus 30 may change the obtainment request transmission intervals L each time transmitting the obtainment request information, or each time transmitting the obtainment request information a plurality of times.

Figure 10:
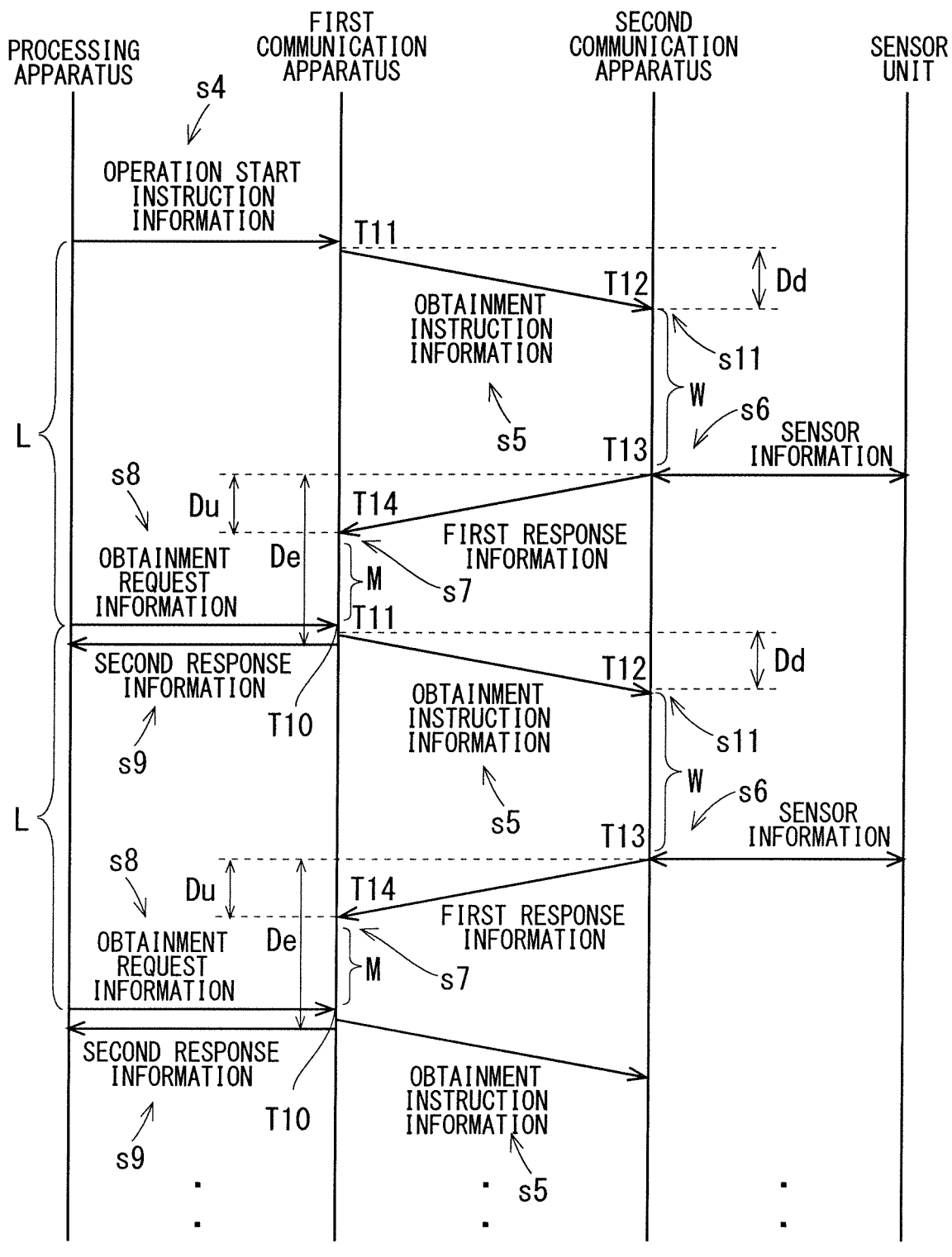
FIG. 10 schematically illustrates example operations of the processing system.

The communication system 10 may execute the synchronization procedure not only in the initial setting but also after the initial setting. FIG. 10 schematically illustrates example operations of the processing system 1 in this case.

In the example of FIG. 10, the first response information to be transmitted by the second communication apparatus 12 includes the time information T13 indicating the transmission time of the first response information, and the time information T12 included in the obtainment instruction information. The time information T13 is, for example, the second count value with the timing to start transmitting the first response information (also referred to as a second uplink transmission start count value).

The controller 111 of the first communication apparatus 11 that receives the first response information obtains time information T14 indicating the reception time of the first response information in Step s7. The time information T14 is, for example, the first count value with the timing to complete receiving the first response information (also referred to as a second uplink reception completion count value). In Step s7, the controller 111 updates the offset value OS based on the obtained time information T14, the time information T11 included in the obtainment instruction information transmitted in Step s5, and the time information T12 and the time information T13 that are included in the first response information. Specifically, the controller 111 updates the offset value OS by substituting the second downlink transmission start count value as the time information T11, the second downlink reception completion count value as the time information T12, the second uplink transmission start count value as the time information T13, and the second uplink reception completion count value as the time information T14 for C1, C2, C3, and C4, respectively, into Equation (1).

After updating the offset value OS during the first unit sensor processing period, the first communication apparatus 11 transmits the updated offset value OS, and the obtainment instruction information including the time information T11 in Step s5 during the next second unit sensor processing period. Upon receipt of the obtainment instruction information, the controller 121 of the second communication apparatus 12 recorrects the second count value based on the offset value OS included in the obtainment instruction information in Step s11 during the second unit sensor processing period. For example, the controller 121 determines a value obtained by subtracting the offset value OS from the second count value to be the corrected second count value. This hardly makes the second count value different from the first count value even when the count-up intervals of the timer 125 are different from those of the timer 115.

During the second unit sensor processing period, the second communication apparatus 12 performs Step s6 after Step s11. In Step s6, the second communication apparatus 12 transmits the first response information including the sensor information, the time information T12, and the time information T13 to the first communication apparatus 11. In Step s7 during the second unit sensor processing period, the controller 111 updates the offset value similarly to Step s7 during the first unit sensor processing period. Subsequently, the processing system 1 operates in the same manner. The controller 121 recorrects the second count value in each unit sensor processing period after the third unit sensor processing period. The controller 121 may recorrect the second count value only once during a plurality of unit sensor processing periods after the second unit sensor processing period.

Although the uplink communication time estimated value Dux is a fixed value included in the setting information to be transmitted by the processing apparatus 30, the second communication apparatus 12 may determine the uplink communication time estimated value Dux. The following will describe various example methods for the second communication apparatus 12 to determine the uplink communication time estimated value Dux.

First Example Method for Determining Uplink Communication Time Estimated Value

In this example, a time D required for communication between the first communication apparatus 11 and the second communication apparatus 12 (hereinafter simply referred to as a communication time D) is measured in the initial setting. The communication time D (see FIG. 8) is, for example, the time from the timing with which one of communication apparatuses starts to transmit information (i.e., a transmission start timing) to the timing with which the other communication apparatus completes receiving the information (i.e., reception completion timing). The communication time D is also latency from transmission of information from one of communication apparatuses to reception of the information by the other communication apparatus. The second communication apparatus 12 determines the uplink communication time estimated value Dux in each unit sensor processing period, based on the communication time D measured in the initial setting (i.e., an actual measured value of the communication time D).

In the initial setting, for example, the controller 111 of the first communication apparatus 11 finds the offset value OS, and finds the communication time D based on the time information T1, the time information T2, the time information T3, and the time information T4 in Step s250. The controller 111 finds the communication time D using the following Equation (3).

$$D=((C2-C1))+((C4-C3))/2 \quad (3)$$

The first communication apparatus 11 transmits, to the second communication apparatus 12, the third information including the offset value OS and the communication time D in Step s260. This enables the second communication apparatus 12 to obtain the communication time D obtained in the initial setting. The controller 121 of the second communication apparatus 12 adopts the obtained communication time D (i.e., an actual measured value) as the uplink communication time estimated value Dux to be used in determining the obtainment/transmission procedure start timing.

A process consisted of Step s210, s220, s230, s240, s250, s260, and s270 is executed repeatedly a plurality of times in the initial setting, so that the second communication apparatus 12 may obtain the measured communication time D a plurality of times. Here, the controller 121 may adopt an average of the obtained communication times D as the uplink communication time estimated value Dux. Alternatively, the controller 121 may adopt the maximum value of the obtained communication times D as the uplink communication time estimated value Dux.

When the second communication apparatus 12 obtains the communication time D a plurality of times in the initial setting, the controller 121 may use a standard deviation (i.e., a degree of variations) of the obtained communication times D as the margin time M.

Second Example Method for Determining Uplink Communication Time Estimated Value

In this example, the controller 121 determines the uplink communication time estimated value Dux to be used for determining the obtainment/transmission procedure start timing during the target unit sensor processing period, based on an actual measured value of the uplink communication time Du (also referred to as an uplink communication time actual measured value) obtained prior to the target unit sensor processing period. The controller 121 determines the obtainment/transmission procedure start timing based on the uplink communication time estimated value Dux. In other words, the controller 121 determines the obtainment/transmission procedure start timing based on the uplink communication time actual measured value.

In this example, the first response information includes the time information T13. In Step s7, the first communication apparatus 11 obtains the time information T14. The controller 111 of the first communication apparatus 11 finds the uplink communication time actual measured value based on the time information T13 and the time information T14 in Step s7. For example, the controller 111 determines, to be the uplink communication time actual measured value, a value (i.e., a count number) obtained by subtracting the second uplink transmission start count value as the time information T13 from the second uplink reception completion count value as the time information T14. This enables the first communication apparatus 11 to obtain, in the target unit sensor processing period, the actual measured value of the uplink communication time Du during the target unit sensor processing period.

Once obtaining, in the p-th unit sensor processing period, the actual measured value of the uplink communication time Du during the p-th unit sensor processing period, the first communication apparatus 11 transmits the obtainment instruction information including the obtained uplink communication time actual measured value to the second communication apparatus 12 in Step s5 during the (p+1)-th unit sensor processing period. In Step s11 during the (p+1)-th unit sensor processing period, the second communication apparatus 12 adopts the uplink communication time actual measured value included in the obtainment instruction information as the uplink communication time estimated value Dux to be used for determining the obtainment/transmission procedure start timing during the (p+1)-th unit sensor processing period.

The second communication apparatus 12 may adopt an average or the maximum value of uplink communication time actual measured values obtained prior to the target unit sensor processing period, as the uplink communication time estimated value Dux during the target unit sensor processing period. The second communication apparatus 12 may adopt, for example, an average of (Q−1) uplink communication time actual measured values obtained from the first unit sensor processing period to the (Q−1)-th unit sensor processing period (i.e., an average of all the uplink communication time actual measured values obtained prior to the Q-th unit sensor processing period) or the maximum value of the (Q−1) uplink communication time actual measured values, as the uplink communication time estimated value Dux during the Q-th unit sensor processing period, where Q is an integer larger than or equal to 3.

As such, the second communication apparatus 12 determines the obtainment/transmission procedure start timing based on the uplink communication time actual measured values. Thus, upon receipt of the obtainment request information, the first communication apparatus 11 can immediately transmit, to the processing apparatus 30, the sensor information obtained with the timing closer to the obtainment request reception timing T10. Consequently, the processing apparatus 30 can immediately obtain the sensor information obtained with the timing closer to transmission of the obtainment request information, after transmitting the obtainment request information.

As understood from the description above, the obtainment instruction information transmitted in Step s5 during the first unit sensor processing period does not include any uplink communication time actual measured values. Thus, the second communication apparatus 12 cannot determine the uplink communication time estimated value Dux to be used in the first unit sensor processing period. As such, when the second communication apparatus 12 cannot determine the uplink communication time estimated value Dux to be used in the target unit sensor processing period due to a reason, for example, lack of necessary information, the second communication apparatus 12 may use a value included in the setting information as the uplink communication time estimated value Dux. Alternatively, the second communication apparatus 12 may determine the uplink communication time estimated value Dux based on the communication time D obtained in the initial setting, similarly to the first example method for determining the uplink communication time estimated value.

Third Example Method for Determining Uplink Communication Time Estimated Value

As described above, the uplink communication time Du may vary according to an operation state of the second communication apparatus 12. Here in this example, the controller 121 determines the uplink communication time estimated value Dux based on the operation state of the second communication apparatus 12. The controller 121 determines the obtainment/transmission procedure start timing based on the uplink communication time estimated value Dux. In other words, the controller 121 determines the obtainment/transmission procedure start timing based on the operation state of the second communication apparatus 12. The controller 121 determines the uplink communication time estimated value Dux, for example, based on a congestion degree of processes in the controller 121 included in the second communication apparatus 12 and a congestion degree of the bus 120 in the second communication apparatus 12.

Figure 11:
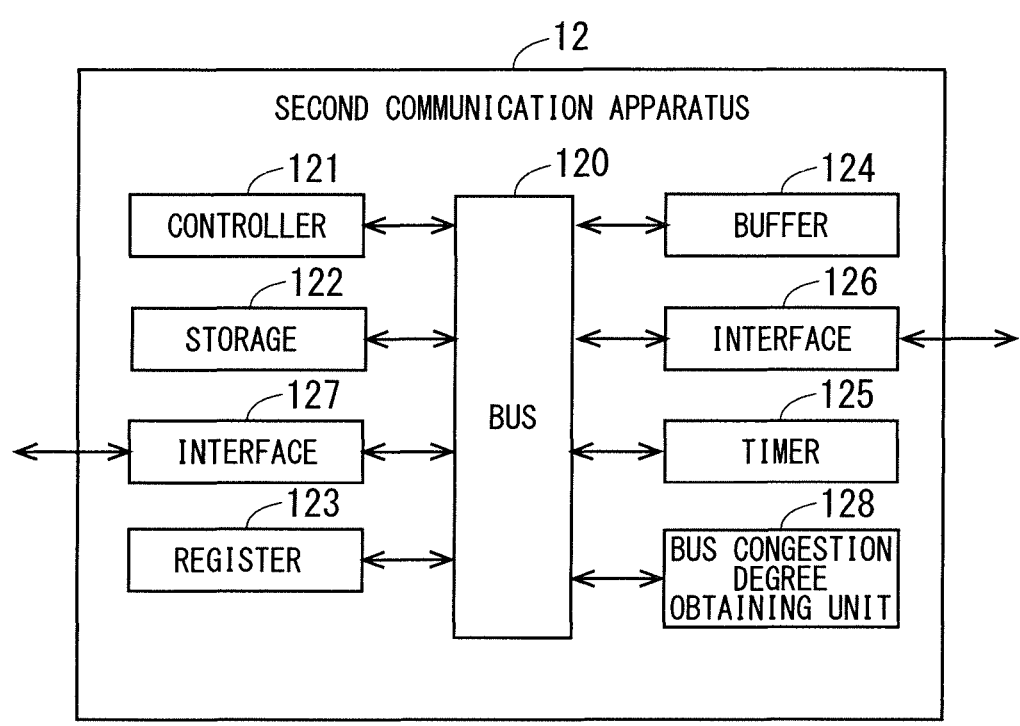
FIG. 11 schematically illustrates an example second communication apparatus.

FIG. 11 schematically illustrates an example configuration of the second communication apparatus 12 in this example. The second communication apparatus 12 in FIG. 11 includes a bus congestion degree obtaining unit 128 that finds a congestion degree of the bus 120 according to an instruction of the controller 121. The bus congestion degree obtaining unit 128 finds a congestion degree of the bus 120 by, for example, monitoring a bus request signal output to the bus 120. For example, the bus congestion degree obtaining unit 128 finds, as the congestion degree of the bus 120, the number of times the bus request signal is output to the bus 120 per unit time. The bus congestion degree obtaining unit 128 outputs the found congestion degree of the bus 120 to the controller 121 through the bus 120. Hereinafter, the congestion degree of the bus 120 in the second communication apparatus 12 may be referred to as a second bus congestion degree.

In this example, the controller 121 finds a congestion degree of processes in the controller 121. The controller 121 finds, for example, a proportion of time except the idle time per unit time as the congestion degree of the processes in the controller 121. Hereinafter, the congestion degree of the processes in the controller 121 included in the second communication apparatus 12 may be referred to as a second control process congestion degree.

In Step s11, the controller 121 obtains the current second control process congestion degree. Furthermore, the controller 121 causes the bus congestion degree obtaining unit 128 to obtain the current second bus congestion degree in Step s11. Furthermore, the controller 121 finds an average of uplink communication time actual measured values obtained in the past in Step s11. For example, the controller 121 calculates an average of (Q-1) uplink communication time actual measured values obtained from the first unit sensor processing period to the (Q-1)-th unit sensor processing period in Step s11 during the Q-th unit sensor processing period. Then, the controller 121 determines the uplink communication time estimated value Dux, based on the obtained second control process congestion degree, the second bus congestion degree obtained by the bus congestion degree obtaining unit 128, and the calculated average of uplink communication time actual measured values in Step s11.

When determining the uplink communication time estimated value Dux, the controller 121 determines to which one of three classifications, namely, "HIGH", "MIDDLE", and "LOW", the second control process congestion degree belongs. For example, when the second control process congestion degree is less than a first threshold, the controller 121 determines the classification of the second control process congestion degree to be "LOW". For example, when the second control process congestion degree is more than and equal to the first threshold and is less than a second threshold larger than the first threshold, the controller 121 determines the classification of the second control process congestion degree to be "MIDDLE". Then, when the second control process congestion degree is more than and equal to the second threshold, the controller 121 determines the classification of the second control process congestion degree to be "HIGH". Furthermore, when determining the uplink communication time estimated value Dux, the controller 121 determines, for example, to which one of three classifications, namely, "HIGH", "MIDDLE", and "LOW", the second bus congestion degree belongs. The method for determining the classification of the second bus congestion degree is identical to, for example, that for determining the classification of the second control process congestion degree. The controller 121 determines the uplink communication time estimated value Dux, according to a combination of the classification of the second control process congestion degree and the classification of the second bus congestion degree.

In this example, the setting information to be transmitted by the processing apparatus 30 includes parameter information B1 including nine parameters b1 corresponding to nine combinations of classifications of the second control process congestion degree and classifications of the second bus congestion degree. FIG. 12 schematically illustrates an example of the parameter information B1. In the example of FIG. 12, for example, the parameter b1 corresponding to the combination of "HIGH" as the classification of the second control process congestion degree and "HIGH" as the classification of the second bus congestion degree is 1.6. Furthermore, the parameter b1 corresponding to the combination of "MIDDLE" as the classification of the second control process congestion degree and "MIDDLE" as the classification of the second bus congestion degree is 1.

In Step s11, the controller 121 reads the parameter information B1 from the setting information in the register 123. Then, the controller 121 obtains, from the parameter information B1, the parameter b1 corresponding to the combination of the current classification of the second control process congestion degree and the current classification of the second bus congestion degree. For example, when both classifications of the second control process congestion degree and the second bus congestion degree obtained in Step s11 are "LOW", the controller 121 obtains 0.4 as the parameter b1 from the parameter information B1. For example, when the classifications of the second control process congestion degree and the second bus congestion degree obtained in Step s11 are "MIDDLE" and "HIGH", respectively, the controller 121 obtains 1.3 as the parameter b1 from the parameter information B1. The controller 121 adopts, as the uplink communication time estimated value Dux, a value obtained by multiplying the obtained parameter b1 by an average of uplink communication time actual measured values.

The controller 121 may use parameter information B2 illustrated in FIG. 13 instead of the parameter information B1. The parameter information B2 includes nine parameters b2 corresponding to nine combinations of classifications of the second control process congestion degree and classifications of the second bus congestion degree. In the example of FIG. 13, for example, the parameter b2 corresponding to the combination of "HIGH" as the classification of the second control process congestion degree and "LOW" as the classification of the second bus congestion degree is 0. Furthermore, the parameter b2 corresponding to the combination of "MIDDLE" as the classification of the second control process congestion degree and "HIGH" as the classification of the second bus congestion degree is 1.5σ. σ in the parameter b2 denotes a standard deviation of uplink communication time actual measured values in the past. The setting information in the register 123 includes the parameter information B2. In other words, the standard deviation of uplink communication time actual measured values is a degree of variations in the uplink communication time actual measured value.

In Step s11, the controller 121 reads the parameter information B2 from the setting information in the register 123. Then, the controller 121 obtains, from the parameter information B2, the parameter b2 corresponding to the combination of the current classification of the second control process congestion degree and the current classification of the second bus congestion degree. For example, when both classifications of the second control process congestion degree and the second bus congestion degree obtained in Step s11 are "LOW", the controller 121 obtains −3σ as the parameter b2 from the parameter information B2. For example, when both classifications of the second control process congestion degree and the second bus congestion degree obtained in Step s11 are "HIGH", the controller 121 obtains 3σ as the parameter b2 from the parameter information B2. Furthermore, the controller 121 calculates a standard deviation of uplink communication time actual measured values in the past in Step s11. For example, the controller 121 calculates a standard deviation of (Q-1) uplink communication time actual measured values obtained from the first unit sensor processing period to the (Q-1)-th unit sensor processing period in Step s11 during the Q-th unit sensor processing period. Then, the controller 121 adopts, as the uplink communication time estimated value Dux, a value obtained by adding the obtained parameter b2 to an average of uplink communication time actual measured values in Step s11. Here, the controller 121 uses the calculated standard deviation of the uplink communication time actual measured values as σ in the parameter b2. In this example, the controller 121 determines the uplink communication time estimated value Dux using the standard deviation of the uplink communication time actual measured values. In other words, the controller 121 determines the obtainment/transmission procedure start timing based on a degree of variations in the uplink communication time actual measured value.

When a data volume of the sensor information varies, the uplink communication time Du of the first response information including the sensor information may vary according to the data volume of the sensor information. For example, when the sensor unit 20 includes a plurality of sensors, a data volume of the sensor information output by the sensor unit 20 may vary. For example, when the sensor unit 20 outputs the sensor information including all detection results of the plurality of sensors in certain timing, the data volume of the sensor information is relatively large. When the sensor unit 20 outputs the sensor information including detection results of a part of the plurality of sensors in another timing, the data volume of the sensor information is relatively small. Even when the sensor unit 20 includes only one sensor, the data volume of the sensor information may vary.

When the data volume of the sensor information varies, the controller 121 may determine the uplink communication time estimated value Dux, based on the second control process congestion degree, the second bus congestion degree, and the data volume of the sensor information.

In Step s11, the controller 121 determines to which one of three classifications, namely, "LARGE", "MIDDLE", and "SMALL", the data volume of the sensor information obtained in Step s6 immediately after Step s11 belongs. The method for determining the classification of the data volume of the sensor information is identical to, for example, that for determining the classification of the second control process congestion degree. The controller 121 determines the uplink communication time estimated value Dux, according to a combination of the classification of the second control process congestion degree, the classification of the second bus congestion degree, and the classification of the data volume of the sensor information.

In this example, the setting information to be transmitted by the processing apparatus 30 includes parameter information B3 including 27 parameters b3 corresponding to 27 combinations of classifications of the second control process congestion degree, classifications of the second bus congestion degree, and classifications of the data volume of the sensor information. FIG. 14 schematically illustrates an example of the parameter information B3. In the example of FIG. 14, for example, the parameter b3 corresponding to the combination of "HIGH" as the classification of the second control process congestion degree, "HIGH" as the classification of the second bus congestion degree, and "LARGE" as the classification of the data volume of the sensor information is 1.6. Furthermore, the parameter b3 corresponding to the combination of "MIDDLE" as the classifications of the second control process congestion degree, "MIDDLE" as the classification of the second bus congestion degree, and "MIDDLE" as the classification of the data volume of the sensor information is 1.

In Step s11, the controller 121 reads the parameter information B3 from the setting information in the register 123. Then, the controller 121 obtains, from the parameter information B3, the parameter b3 corresponding to the combination of the current classification of the second control process congestion degree, the current classification of the second bus congestion degree, and the classification of the data volume of the sensor information obtained in Step s6. For example, when the classification of the second control process congestion degree obtained in Step s11 is "LOW", the second bus congestion degree obtained in Step s11 is "LOW", and the classification of the data volume of the sensor information obtained in Step s6 is "SMALL", the controller 121 obtains 0.4 as the parameter b3 from the parameter information B3. For example, when the classification of the second control process congestion degree obtained in Step s11 is "MIDDLE", the classification of the second bus congestion degree obtained in Step s11 is "LOW", and the classification of the data volume of the sensor information obtained in Step s6 is "LARGE", the controller 121 obtains 1 as the parameter b3 from the parameter information B3. The controller 121 adopts, as the uplink communication time estimated value Dux, a value obtained by multiplying the obtained parameter b3 by an average of uplink communication time actual measured values.

The controller 121 may use parameter information B4 illustrated in FIG. 15 instead of the parameter information B3. The parameter information B4 includes 27 parameters b4 corresponding to 27 combinations of classifications of the second control process congestion degree, classifications of the second bus congestion degree, and classifications of the data volume of the sensor information. In the example of FIG. 15, for example, the parameter b4 corresponding to the combination of "HIGH" as the classification of the second control process congestion degree, "MIDDLE" as the classification of the second bus congestion degree, and "SMALL" as the classification of the data volume of the sensor information is 0. For example, the parameter b4 corresponding to the combination of "MIDDLE" as the classifications of the second control process congestion degree, "MIDDLE" as the classification of the second bus congestion degree, and "LARGE" as the classification of the data volume of the sensor information is $\sigma$. Similarly to $\sigma$ in the parameter b2, $\sigma$ in the parameter b4 denotes a standard deviation of uplink communication time actual measured values in the past. The setting information in the register 123 includes the parameter information B4.

In Step s11, the controller 121 reads the parameter information B4 from the setting information in the register 123. Then, the controller 121 obtains, from the parameter information B4, the parameter b4 corresponding to the combination of the current classification of the second control process congestion degree, the current classification of the second bus congestion degree, and the classification of the data volume of the sensor information obtained in Step s6. For example, when the classification of the second control process congestion degree obtained in Step s11 is "MIDDLE", the classification of the second bus congestion degree obtained in Step s11 is "LOW", and the classification of the data volume of the sensor information obtained in Step s6 is "MIDDLE", the controller 121 obtains $-\sigma$ as the parameter b4 from the parameter information B4. In Step s11, the controller 121 calculates a standard deviation of uplink communication time actual measured values in the past, similarly to when using the parameter information B2. Then, the controller 121 adopts, as the uplink communication time estimated value Dux, a value obtained by adding the obtained parameter b4 to an average of the uplink communication time actual measured values in Step s11. Here, the controller 121 uses the calculated standard deviation as $\sigma$ in the parameter b4.

The controller 121 may determine the uplink communication time estimated value Dux based on only one of the second control process congestion degree, the second bus congestion degree, and the data volume of the sensor information. For example, suppose a case where the controller 121 determines the uplink communication time estimated value Dux based on the second control process congestion degree. Here, the setting information includes parameter information including three parameters corresponding to three classifications of the second control process congestion degree. The controller 121 reads a parameter corresponding to the current classification of the second control process congestion degree from the parameter information in the register 123. Then, the controller 121 determines the uplink communication time estimated value Dux, for example, based on the read parameter and the average of the uplink communication time actual measured values. For example, when the read parameter is identical to the parameter b1, the controller 121 adopts, as the uplink communication time estimated value Dux, a value obtained by multiplying the read parameter by the average of uplink communication time actual measured values. When determining the uplink communication time estimated value Dux based on the second bus congestion degree, the controller 121 operates in the same manner. Furthermore, when determining the uplink communication time estimated value Dux based on the data volume of the sensor information, the controller 121 operates in the same manner.

The controller 121 may determine the uplink communication time estimated value Dux, based on the second control process congestion degree and the data volume of the sensor information or based on the second bus congestion degree and the data volume of the sensor information. For example, suppose a case where the controller 121 determines the uplink communication time estimated value Dux, based on the second control process congestion degree and the data volume of the sensor information. Here, the setting information includes parameter information including nine parameters corresponding to nine combinations of the classifications of the second control process congestion degree and the classifications of the data volume of the sensor information. The controller 121 reads a parameter corresponding to the current classification of the second control process congestion degree and the classification of the data volume of the sensor information obtained in Step s6, from the parameter information in the register 123. Then, the controller 121 determines the uplink communication time estimated value Dux based on the read parameter and an average of uplink communication time actual measured values. For example, when the read parameter is identical to the parameter b1, the controller 121 adopts, as the uplink communication time estimated value Dux, a value obtained by multiplying the read parameter by the average of uplink communication time actual measured values. When determining the uplink communication time estimated value Dux based on the second bus congestion degree and the data volume of the sensor information, the controller 121 operates in the same manner.

As such, the controller 121 determines the obtainment/transmission procedure start timing based on an operation state of the second communication apparatus 12. Thus, upon receipt of the obtainment request information, the first communication apparatus 11 can immediately transmit, to the processing apparatus 30, the sensor information obtained with the timing closer to the obtainment request reception timing T10. Consequently, the processing apparatus 30 can immediately obtain the sensor information obtained with the timing closer to the timing to transmit the obtainment request information, after transmitting the obtainment request information.

Fourth Example Method for Determining Uplink Communication Time Estimated Value

As described above, the uplink communication time Du may vary according to an operation state of the first communication apparatus 11. Here in this example, the controller 121 determines the uplink communication time estimated value Dux based on the operation state of the first communication apparatus 11. The controller 121 determines the obtainment/transmission procedure start timing based on the uplink communication time estimated value Dux. In other words, the controller 121 determines the obtainment/transmission procedure start timing based on the operation state of the first communication apparatus 11. The controller 121 determines the uplink communication time estimated value Dux, for example, based on a congestion degree of processes to be performed by the controller 111 included in the first communication apparatus 11 and a congestion degree of the bus 110 in the first communication apparatus 11.

Figure 16:
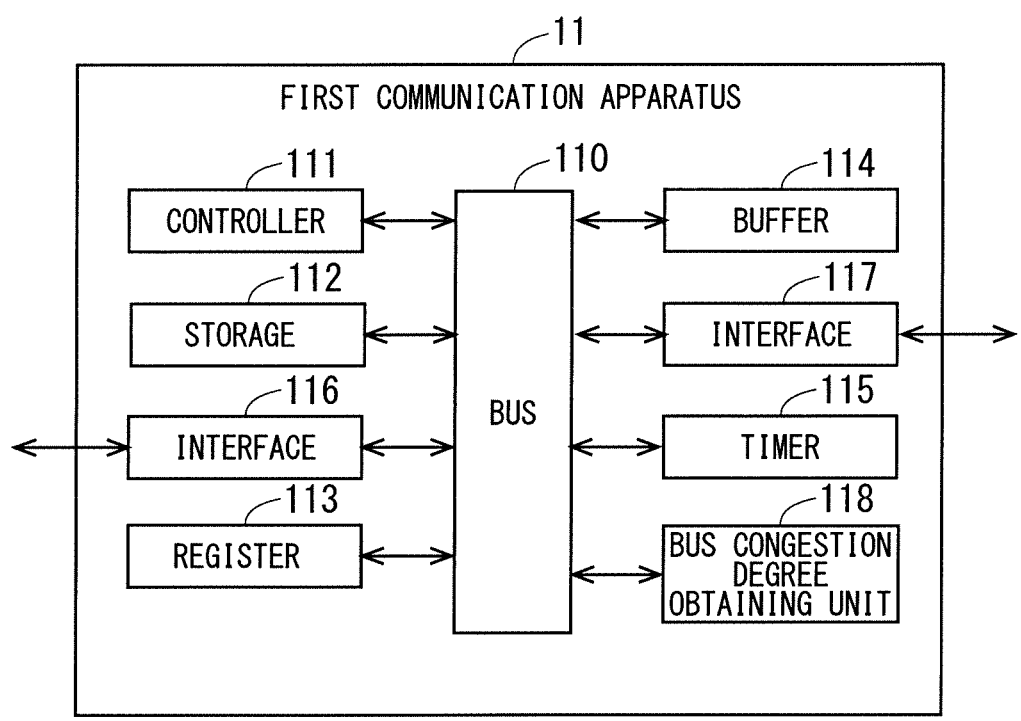
FIG. 16 schematically illustrates an example first communication apparatus.

FIG. 16 schematically illustrates an example configuration of the first communication apparatus 11 in this example. The first communication apparatus 11 in FIG. 16 includes a bus congestion degree obtaining unit 118 that finds a congestion degree of the bus 110 according to an instruction of the controller 111. For example, the bus congestion degree obtaining unit 118 finds, as a congestion degree of the bus 110, the number of times a bus request signal is output to the bus 110 per unit time, similarly to the bus congestion degree obtaining unit 128. The bus congestion degree obtaining unit 118 outputs the found congestion degree of the bus 110 to the controller 111 through the bus 110. Hereinafter, the congestion degree of the bus 110 may be referred to as a first bus congestion degree.

In this example, the controller 111 finds a congestion degree of processes in the controller 111. The controller 111 finds, for example, a proportion of time except the idle time per unit time as the congestion degree of the processes in the controller 111. Hereinafter, the congestion degree of the processes in the controller 111 may be referred to as a first control process congestion degree.

In Step s5, the controller 111 obtains the current first control process congestion degree. Furthermore, the controller 111 causes the bus congestion degree obtaining unit 118 to obtain the current first bus congestion degree in Step s5. Then in Step s5, the controller 111 causes the interface 117 to transmit, to the second communication apparatus 12, the obtainment instruction information including the obtained first control process congestion degree and the first bus congestion degree obtained by the bus congestion degree obtaining unit 118.

The controller 121 in the second communication apparatus 12 finds an average of uplink communication time actual measured values obtained in the past in Step s11 similarly to the third example method for determining the uplink communication time estimated value. Then in Step s11, the controller 121 determines the uplink communication time estimated value Dux, based on the first control process congestion degree and the first bus congestion degree that are included in the obtainment instruction information, and the calculated average of uplink communication time actual measured values.

The controller 121 determines, for example, to which one of three classifications, namely, "HIGH", "MIDDLE", and "LOW", the first control process congestion degree belongs similarly to when using the second control process congestion degree. Furthermore, the controller 121 determines to which one of three classifications, namely, "HIGH", "MIDDLE", and "LOW", the second bus congestion degree belongs similarly to when using the first bus congestion degree.

In this example, the setting information includes parameter information similar to the parameter information B1. This parameter information includes nine parameters b1 corresponding to nine combinations of classifications of the first control process congestion degree and classifications of the first bus congestion degree. In Step s11, the controller 121 reads the parameter information from the setting information in the register 123. Then, the controller 121 obtains, from the parameter information, a parameter corresponding to the combination of the classification of the first control process congestion degree and the classification of the first bus congestion degree. The controller 121 adopts, as the uplink communication time estimated value Dux, a value obtained by multiplying the obtained parameter by an average of uplink communication time actual measured values.

The controller 121 may use parameter information similar to the parameter information B2 instead of the parameter information similar to the parameter information B1. This parameter information includes nine parameters corresponding to nine combinations of classifications of the first control process congestion degree and classifications of the first bus congestion degree. In Step s11, the controller 121 reads the parameter information similar to the parameter information B2 from the setting information in the register 123. Furthermore, the controller 121 calculates a standard deviation of uplink communication time actual measured values in the past in Step s11, similarly to the third example method for determining the uplink communication time estimated value. Then, the controller 121 obtains, from the parameter information, a parameter corresponding to the combination of the classification of the first control process congestion degree and the classification of the first bus congestion degree. Then, the controller 121 adopts, as the uplink communication time estimated value Dux, a value obtained by adding the obtained parameter to the average of uplink communication time actual measured values in Step s11. Here, the controller 121 uses the calculated standard deviation as σ in the parameter.

When the data volume of the sensor information varies, the controller 121 may determine the uplink communication time estimated value Dux based on the first control process congestion degree, the first bus congestion degree, and the data volume of the sensor information. Here in Step s11, the controller 121 determines to which one of three classifications, namely, "LARGE", "MIDDLE", and "SMALL", the data volume of the sensor information obtained in Step s6 after Step s11 belongs. The setting information to be transmitted by the processing apparatus 30 includes parameter information similar to the parameter information B3. This parameter information includes 27 parameters b3 corresponding to 27 combinations of classifications of the first control process congestion degree, classifications of the first bus congestion degree, and classifications of the data volume of the sensor information. In Step s11, the controller 121 reads the parameter information from the setting information in the register 123. Then, the controller 121 obtains, from the parameter information, a parameter corresponding to the combination of the classification of the first control process congestion degree, the classification of the first bus congestion degree, and the classification of the data volume of the sensor information obtained in Step s6. Then, the controller 121 adopts, as the uplink communication time estimated value Dux, a value obtained by multiplying the obtained parameter by an average of uplink communication time actual measured values.

The controller 121 may use parameter information similar to the parameter information B4 instead of the parameter information similar to the parameter information B3. This parameter information includes 27 parameters corresponding to 27 combinations of classifications of the first control process congestion degree, classifications of the first bus congestion degree, and classifications of the data volume of the sensor information. In Step s11, the controller 121 reads the parameter information from the setting information in the register 123. Then, the controller 121 obtains, from the parameter information, a parameter corresponding to the combination of the classification of the first control process congestion degree, the classification of the first bus congestion degree, and the classification of the data volume of the sensor information obtained in Step s6. Furthermore, the controller 121 calculates a standard deviation of uplink communication time actual measured values in the past in Step s11, similarly to the third example method for determining the uplink communication time estimated value. Then, the controller 121 adopts, as the uplink communication time estimated value Dux, a value obtained by adding the obtained parameter to the average of the uplink communication time actual measured values in Step s11. Here, the controller 121 uses the calculated standard deviation as σ in the parameter b4.

The controller 121 may determine the uplink communication time estimated value Dux based on only one of the first control process congestion degree, the first bus congestion degree, and the data volume of the sensor information. The operation of the controller 121 in this case is identical to that when determining the uplink communication time estimated value Dux based on only one of the second control process congestion degree, the second bus congestion degree, and the data volume of the sensor information.

The controller 121 may determine the uplink communication time estimated value Dux, based on the first control process congestion degree and the data volume of the sensor information. The operation of the controller 121 in this case is identical to that when determining the uplink communication time estimated value Dux based on the second control process congestion degree and the data volume of the sensor information. Furthermore, the controller 121 may determine the uplink communication time estimated value Dux, based on the first bus congestion degree and the data volume of the sensor information. The operation of the controller 121 in this case is identical to that when determining the uplink communication time estimated value Dux based on the second bus congestion degree and the data volume of the sensor information.

As such, the controller 121 determines the obtainment/transmission procedure start timing based on an operation state of the first communication apparatus 11. Thus, upon receipt of the obtainment request information, the first communication apparatus 11 can immediately transmit, to the processing apparatus 30, the sensor information obtained with the timing closer to the obtainment request reception timing T10. Consequently, the processing apparatus 30 can immediately obtain the sensor information obtained with the timing closer to the timing to transmit the obtainment request information, after transmitting the obtainment request information.

Although the margin time M is a fixed value in the example above, the second communication apparatus 12 may adjust the margin time M. The following will describe a method for adjusting the margin time M.

Method for Adjusting Margin Time M

The controller 121 may adjust the margin time M based on a degree of variations in the uplink communication time actual measured value. The controller 121 determines the obtainment/transmission procedure start timing based on the margin time M. In other words, the controller 121 determines the obtainment/transmission procedure start timing based on the degree of variations in the uplink communication time actual measured value when adjusting the margin time M based on the degree of variations in the uplink communication time actual measured value.

In this example, the first communication apparatus 11 obtains, in the target unit sensor processing period, the uplink communication time actual measured values during the target unit sensor processing period, similarly to the second example method for determining the uplink communication time estimated value. Then, the first communication apparatus 11 transmits, to the second communication apparatus 12, the obtainment instruction information including the obtained uplink communication time actual measured values in Step s5 in a unit sensor processing period next to the target unit sensor processing period.

In Step s11, the controller 121 in the second communication apparatus 12 adjusts the margin time M based on the latest degree of variations in the uplink communication time actual measured value. In Step s11, the controller 121 determines the obtainment/transmission procedure start timing using the adjusted margin time M.

The controller 121, for example, calculates a standard deviation of uplink communication time actual measured values found relatively recently, and adopts the calculated standard deviation as the latest degree of variations in the uplink communication time actual measured value. For example, when adjusting the margin time M in Step s11 during the target unit sensor processing period, the controller 121 adopts a standard deviation of R uplink communication time actual measured values obtained from an R-th previous target unit sensor processing period with respect to the target unit sensor processing period to a unit sensor processing period immediately preceding the target unit sensor processing period as the latest degree of variations in the uplink communication time actual measured value. The value of R is set, for example, from several tens to several hundreds.

When the latest degree of variations in the uplink communication time actual measured value (e.g., the standard deviation of uplink communication time actual measured values obtained recently) is less than a threshold, the controller 121 reduces the margin time M by a predetermined amount in Step s11. When the latest degree of variations in the uplink communication time actual measured value is more than or equal to the threshold, the controller 121 increases the margin time M by a predetermined amount in Step s11.

When the degree of variations in the uplink communication time actual measured value tends to decrease, the controller 121 may reduce the margin time M by a predetermined amount. When the degree of variations in the uplink communication time actual measured value tends to increase, the controller 121 may increase the margin time M by a predetermined amount.

As such, the controller 121 determines the obtainment/transmission procedure start timing based on the degree of variations in the uplink communication time actual measured value. Thus, upon receipt of the obtainment request information, the first communication apparatus 11 can immediately transmit, to the processing apparatus 30, the sensor information obtained with the timing closer to the obtainment request reception timing T10. Consequently, the processing apparatus 30 can immediately obtain the sensor information obtained with the timing closer to the timing to transmit the obtainment request information, after transmitting the obtainment request information.

The processing apparatus 30 may estimate the sensor information obtained by the sensor unit 20 at a predetermined time, based on the sensor information transmitted from the first communication apparatus 11 a plurality of times. The following will describe example operations of the processing system 1 in this case.

Estimation of Sensor Information

The second communication apparatus 12 transmits, to the first communication apparatus 11, the first response information including the time information T13 in Step s6. The controller 111 in the first communication apparatus 11 finds an elapsed time De (see FIGS. 9 and 10) from the time at which the sensor information has been obtained from the sensor unit 20 (also referred to as a sensor information obtainment time), based on the time information T13 included in the first response information. The elapsed time De is, for example, an elapsed time from the sensor information obtainment time to the time at which the first communication apparatus 11 transmits the sensor information to the processing apparatus 30 (also referred to as a sensor information transmission time). In other words, the time at which the second communication apparatus 12 has obtained the sensor information from the sensor unit 20 is the time at which the sensor unit 20 has obtained the sensor information. Since the sensor information obtainment time is almost the same as the time indicated by the time information T13 in this example, the controller 111 determines the time indicated by the time information T13 to be the sensor information obtainment time. Furthermore, the controller 111 determines, for example, the timing to start transmitting the second response information including the sensor information to be the sensor information transmission time. The controller 111 obtains the first count value with the timing to start transmitting the second response information as a sensor information transmission start count value. The controller 111 determines, as the elapsed time De, a time obtained by multiplying, by a count-up cycle of the timer 115, a value (i.e., a count number) obtained by subtracting the second uplink transmission start count value as the time information T13 from the sensor information transmission start count value. In this example, the setting information includes a unit of the elapsed time De when the first communication apparatus 11 transmits the elapsed time De to the processing apparatus 30. Examples of the unit of the elapsed time De include microsecond, millisecond, and second. The controller 111 matches the unit of the elapsed time De with the unit included in the setting information in the register 113. The controller 111 causes the interface 116 to transmit, to the processing apparatus 30, the second response information including the obtained elapsed time De and the sensor information in Step s9.

The first response information may include time information indicating the actual time at which the sensor information has been obtained (e.g., the second count value with the timing with which the sensor information has been obtained). Here, the time indicated by the time information may be the sensor information obtainment time.

Upon receipt of the second response information, the controller 310 in the processing apparatus 30 estimates the sensor information obtainment time based on the elapsed time De included in the second response information. For example, the controller 310 determines, to be an estimated time of the sensor information obtainment time (also referred to as a sensor information obtainment estimated time), the time preceding the time at which the processing apparatus 30 has received the second response information by the elapsed time De. The time at which the processing apparatus 30 has received the second response information may be, for example, the timing to complete receiving the second response information. The processing apparatus 30 includes, for example, a timer similar to the timers 115 and 125. The timer manages the time (i.e., timing) in the processing apparatus 30, using a count value counted by the timer. The controller 310 associates the sensor information obtainment estimated time with the sensor information included in the second response information, and stores the time and the information in the storage 320. Each time the processing apparatus 30 receives the second response information, execution of such processes causes the storage 320 to store a plurality of combinations of sensor information and a sensor information obtainment estimated time that is an estimated time of the time at which the sensor information has been obtained. Hereinafter, a combination of sensor information and a sensor information obtainment estimated time that is an estimated time of the time at which the sensor information has been obtained may be referred to as a sensor information-time combination.

The controller 310, for example, finds an approximate expression indicating a relationship between the sensor information and a sensor information obtainment estimated time that is an estimated time of the time at which the sensor information has been obtained, based on a plurality of sensor information-time combinations stored in the storage 320. The approximate expression may be a linear function, a spline function, or another expression. Then, the controller 310 estimates the sensor information obtained by the sensor unit 20 at a predetermined time, based on the found approximate expression. The sensor information obtained by the sensor unit 20 at a predetermined time is the sensor information obtained by the second communication apparatus 12 at the predetermined time from the sensor unit 20. For example, the controller 310 substitutes the time at which the obtainment request information is transmitted to the first communication apparatus 11 (also referred to as an obtainment request transmission time) as the sensor information obtainment estimated time into the approximate expression. Consequently, the controller 310 estimates the sensor information obtained by the sensor unit 20 at the obtainment request transmission time. This enables the processing apparatus 30 to obtain an estimated value of the sensor information obtained with the timing to transmit the obtainment request information. The obtainment request transmission time may be, for example, the timing to start transmitting the obtainment request information. Each time the controller 310 receives the second response information, that is, each time a new sensor information-time combination is stored in the storage 320, the controller 310 updates the approximate expression using the new sensor information-time combination. Then, each time receiving the second response information, the controller 310, for example, estimates the sensor information obtained by the sensor unit 20 at the obtainment request transmission time, using the updated approximate expression. This enables, for example, the processing apparatus 30 to provide, based on always the latest sensor information, the actuator 71 with appropriate feedback control.

Furthermore, the processing apparatus 30 can obtain, with the timing closer to transmission of the obtainment request information, the sensor information obtained with the timing closer to transmission of the obtainment request information. Thus, the controller 310 can find the approximate expression using the latest sensor information. This improves the accuracy of the approximate expression.

The elapsed time De may be an elapsed time from the sensor information obtainment time to the timing T10 with which the first communication apparatus 11 receives the obtainment request information (i.e., the obtainment wish timing). In other words, the obtainment request reception timing T10 is the time at which the first communication apparatus 11 receives the obtainment request information. Here, the timing to complete receiving the obtainment request information may be used as the obtainment request reception timing T10 (i.e., the obtainment wish timing). The controller 111 obtains the first count value with the timing to complete receiving the obtainment request information as an obtainment request reception count value. Then, the controller 111 determines, to be the elapsed time De, a value obtained by multiplying, by a count-up cycle of the timer 115, a value obtained by subtracting the second uplink transmission start count value as the time information T13 from the obtainment request reception count value. The controller 111 causes the interface 116 to transmit, to the processing apparatus 30, the second response information including the obtained elapsed time De and the sensor information in Step s9. Upon receipt of the second response information, the controller 310 in the processing apparatus 30 determines the time preceding the obtainment request transmission time by the elapsed time De to be the sensor information obtainment estimated time. Then, the controller 310 associates the sensor information obtainment estimated time with the sensor information included in the second response information, and stores the time and the information in the storage 320.

As such, the processing apparatus 30 can estimate the sensor information obtained by the sensor unit 20 at a predetermined time, based on a combination between the sensor information and the elapsed time De which is transmitted from the first communication apparatus 11 a plurality of times. Consequently, the processing apparatus 30 can obtain the sensor information at a desired time.

Since the processing apparatus 30 can receive the sensor information obtained with the timing closer to the obtainment wish timing with which the processing apparatus 30 wishes to obtain the sensor information, with the timing closer to the obtainment wish timing, the processing apparatus 30 can estimate the sensor information at a desired time, using the latest sensor information. This improves the accuracy of estimating the sensor information.

The processing apparatus 30 may estimate, based on the approximate expression, the sensor information obtained by the sensor unit 20 at the reception time of the second response information, or the sensor information obtained by the sensor unit 20 at another time. The processing apparatus 30 can estimate, based on the approximate expression, the sensor information obtained by the sensor unit 20 at a desired time.

When the uplink communication time Du varies or is longer beyond its assumption, there is a possibility that the timing to receive the sensor information is later than the timing to receive the obtainment request information in the first communication apparatus 11. Here, there is a possibility that the processing apparatus 30 waits for a long time from the timing with which the processing apparatus 30 wishes to obtain the sensor information until actually receiving the sensor information (in detail, the second response information).

Upon receipt of the obtainment request information from the processing apparatus 30, when the first communication apparatus 11 has not received, from the second communication apparatus 12 yet, the sensor information to be transmitted to the processing apparatus 30 according to the receipt of the obtainment request information, the first communication apparatus 11 may make a notification to the processing apparatus 30. In other words, when the obtainment wish timing with which the processing apparatus 30 wishes to obtain the sensor information arrives and the first communication apparatus 11 has not received, from the second communication apparatus 12 yet, the sensor information to be transmitted to the processing apparatus 30 in response to the obtainment wish timing, the first communication apparatus 11 may make a notification to the processing apparatus 30. For example, upon receipt of the obtainment request information, when the first communication apparatus 11 has not received the first response information including the sensor information yet, the controller 111 may notify the processing apparatus 30 of an error indicating no reception of the sensor information through the interface 116. The controller 111 may, for example, determine the occurrence of the timing to complete receiving certain information to be reception of the certain information. Furthermore, the controller 111 may determine no occurrence of the timing to complete receiving certain information to be no reception of the certain information by the first communication apparatus 11.

Upon receipt of the error notification from the first communication apparatus 11, the processing apparatus 30 may, for example, immediately transmit the obtainment request information to the first communication apparatus 11. Here, the processing apparatus 30 may transmit the obtainment request information after the obtainment request transmission interval L since transmission of the obtainment request information according to the error notification (e.g., since the timing to start transmitting the obtainment request information). Upon receipt of the error notification and when finding an approximate expression as described above, the processing apparatus 30 may estimate the sensor information obtained by the sensor unit 20 at a predetermined time, based on the approximate expression that has not been updated yet (i.e., the current approximate expression).

In the case where the first communication apparatus 11 has not received the sensor information from the second communication apparatus 12 yet upon receipt of the obtainment request information from the processing apparatus 30, when the first communication apparatus 11 receives the sensor information during a predetermined period from receipt of the obtainment request information, the first communication apparatus 11 may transmit the sensor information to the processing apparatus 30. In other words, in the case where the obtainment wish timing arrives and the first communication apparatus 11 has not received the sensor information from the second communication apparatus 12 yet, when the first communication apparatus 11 receives the sensor information during a predetermined period from the obtainment wish timing, the first communication apparatus 11 may transmit the sensor information to the processing apparatus 30. Putting it differently, in the case where the first communication apparatus 11 does not receive the first response information from the second communication apparatus 12 yet upon receipt of the obtainment request information from the processing apparatus 30, when the first communication apparatus 11 receives the first response information during a predetermined period from receipt of the obtainment request information, the first communication apparatus 11 may transmit the second response information to the processing apparatus 30. Furthermore, when the first communication apparatus 11 does not receive the sensor information during a predetermined period from receipt of the obtainment request information, the first communication apparatus 11 may make a notification to the processing apparatus 30 (e.g., the aforementioned error notification). In other words, when the first communication apparatus 11 does not receive the sensor information during a predetermined period from the obtainment wish timing, the first communication apparatus 11 may make a notification to the processing apparatus 30. Putting it differently, when the first communication apparatus 11 does not receive the first response information during a predetermined period from receipt of the obtainment request information, the first communication apparatus 11 may make a notification to the processing apparatus 30. The predetermined period may approximately range, for example, from several hundred microseconds to one second.

When the first communication apparatus 11 has not received the sensor information from the second communication apparatus 12 yet upon receipt of the obtainment request information from the processing apparatus 30, the first communication apparatus 11 may transmit error information indicating the situation to the second communication apparatus 12. In other words, when the first communication apparatus 11 has not received the sensor information from the second communication apparatus 12 yet upon arrival of the obtainment wish timing, the first communication apparatus 11 may transmit error information indicating the situation to the second communication apparatus 12. In this case, the first communication apparatus 11 may, for example, include the error information in the next obtainment instruction information. Upon receipt of the obtainment instruction information including the error information, the second communication apparatus 12 may increase the margin time M by a predetermined period.

Figure 17:
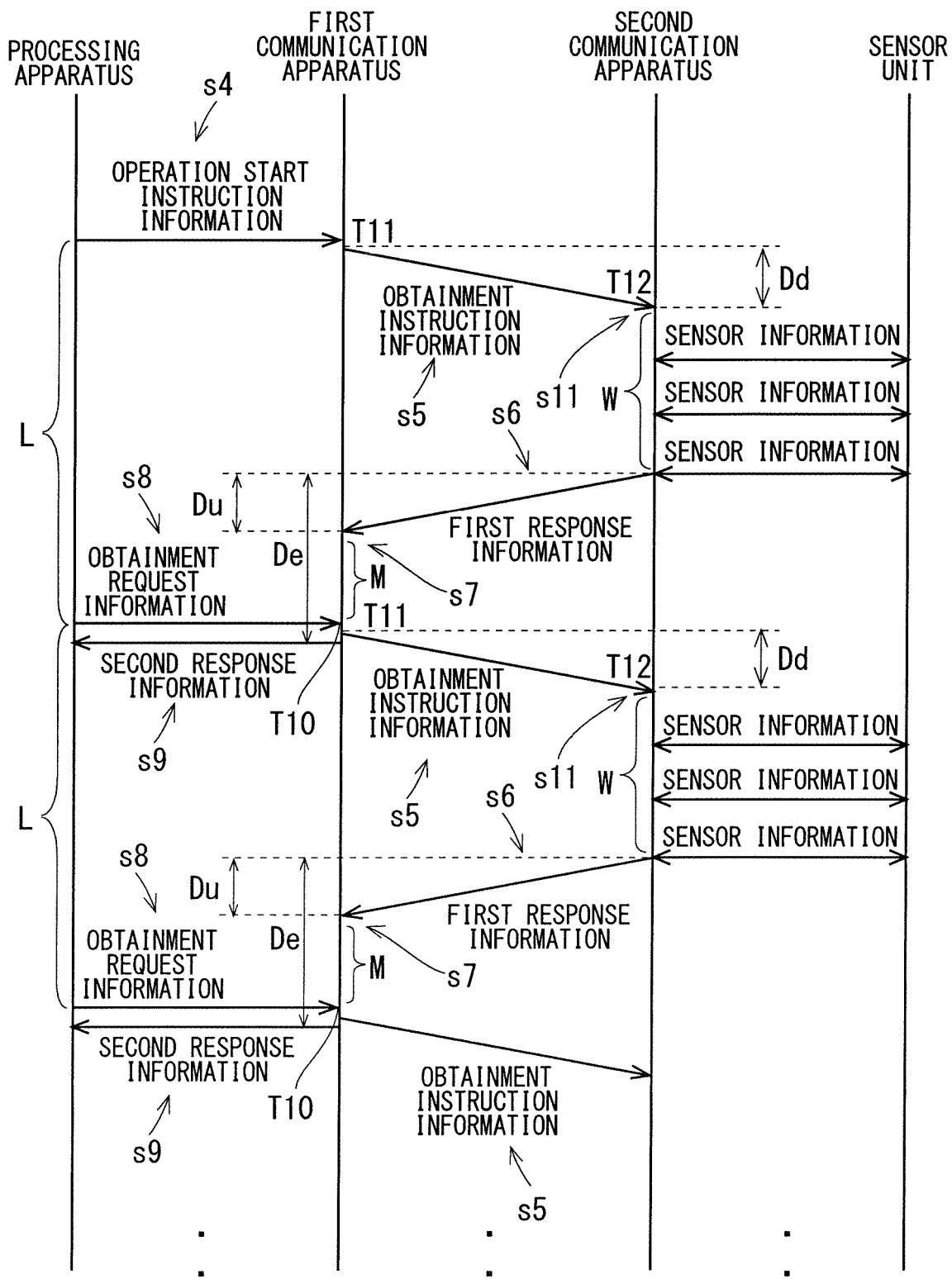
FIG. 17 schematically illustrates example operations of the processing system.

The second communication apparatus 12 may obtain the sensor information a plurality of times and transmit pieces of the sensor information to the first communication apparatus 11, while the communication system 10 (in detail, the first communication apparatus 11) receives the obtainment request information two consecutive times. In other words, the second communication apparatus 12 may obtain the sensor information a plurality of times and transmit the pieces of the sensor information to the first communication apparatus 11, between two consecutive obtainment wish timings in the processing system 1. FIG. 17 schematically illustrates example operations of the processing system 1 in this case.

In this example, the second communication apparatus 12 obtains the sensor information at least once from the sensor unit 20 during the wait time W in addition to the obtainment/transmission procedure in Step s6, while the first communication apparatus 11 receives the obtainment request information two consecutive times (i.e., between two consecutive obtainment wish timings). Then, the second communication apparatus 12 collectively transmits the obtained pieces of sensor information to the first communication apparatus 11 in the obtainment/transmission procedure in Step s6.

Furthermore, the second communication apparatus 12 obtains the sensor information at least once from the sensor unit 20 during the wait time W in addition to the obtainment/transmission procedure in Step s6, until the first communication apparatus 11 receives the next obtainment request information after receiving the operation start instruction information. Then, the second communication apparatus 12 collectively transmits the obtained pieces of sensor information to the first communication apparatus 11 in the obtainment/transmission procedure in Step s6.

The setting information includes parameter information E defining obtainment intervals at which the second communication apparatus 12 obtains the sensor information and the number of obtainment times the second communication apparatus 12 obtains the sensor information. FIG. 18 schematically illustrates an example of the parameter information E. The parameter information E includes, for example, obtainment intervals E1 of the sensor information with respect to the obtainment/transmission procedure start timing, and the number of obtainment times E2 of the sensor information. The unit of the obtainment intervals E1 is, for example, millisecond.

For example, suppose a case where the number of obtainment times E2=1 and the obtainment intervals E1=0. During the unit sensor processing period, the second communication apparatus 12 does not obtain the sensor information except for obtaining the sensor information in Step s6. Specifically, the operations of the processing system 1 are identical to those in FIGS. 9 and 10.

As another example, suppose a case where the number of obtainment times E2=2 and the obtainment intervals E1=1. During the unit sensor processing period, the second communication apparatus 12 obtains the sensor information once in addition to obtaining the sensor information in Step s6. The second communication apparatus 12 obtains, from the sensor unit 20, the sensor information 1 ms before the obtainment/transmission procedure start timing, in addition to executing Step s6.

As another example, suppose a case where the number of obtainment times E2=3 and the obtainment intervals E1=1. During the unit sensor processing period, the second communication apparatus 12 obtains the sensor information twice in addition to obtaining the sensor information in Step s6. In addition to executing Step s6, the second communication apparatus 12 obtains, from the sensor unit 20, the sensor information 1 ms before the obtainment/transmission procedure start timing, and obtains the sensor information from the sensor unit 20 further 1 ms before the previous obtainment (i.e., 2 ms before the obtainment/transmission procedure start timing).

As another example, suppose a case where the obtainment intervals E1=0. Here, the second communication apparatus 12 obtains the sensor information only the number of obtainment times E2 at intervals of a time obtained by dividing the wait time W by the number of obtainment times E2. For example, suppose a case where the obtainment intervals E1=0 and the number of obtainment times E2=3. Here, the second communication apparatus 12 obtains the sensor information from the sensor unit 20 three times at intervals of a value obtained by dividing the wait time W by 3 (i.e., a W/3 time). The second communication apparatus 12 obtains the sensor information in Step s6 as once in the three times. The second communication apparatus 12 obtains, from the sensor unit 20, the sensor information the W/3 time before the obtainment/transmission procedure start timing, in addition to obtaining the sensor information in Step s6, and further obtains the sensor information from the sensor unit 20 the W/3 time before the previous obtainment (i.e., a 2 W/3 time before the obtainment/transmission procedure start timing).

FIG. 17 schematically illustrates that the second communication apparatus 12 obtains the sensor information twice during the unit sensor processing period, in addition to obtaining the sensor information in Step s6. The first response information to be transmitted by the second communication apparatus 12 in Step s6 during the target unit sensor processing period includes all a plurality of pieces of sensor information obtained during the target unit sensor processing period (three pieces of sensor information in FIG. 17). The first response information includes sensor-information obtainment time information corresponding to each of the pieces of sensor information and indicating the time at which the second communication apparatus 12 has obtained the sensor information. The sensor-information obtainment time information is, for example, a second count value with the timing with which the sensor information has been obtained from the sensor unit 20. The sensor-information obtainment time information of the sensor information obtained in Step s6 may be the time information T13.

Upon receipt of the first response information including the pieces of sensor information and a plurality of pieces of sensor-information obtainment time information, the first communication apparatus 11 finds the elapsed time De for each of the pieces of sensor information. Then, the first communication apparatus 11 transmits, to the processing apparatus 30, the second response information including the pieces of sensor information received from the second communication apparatus 12 and a plurality of elapsed times De corresponding to the pieces of sensor information.

Upon receipt of the second response information, the controller 310 in the processing apparatus 30 estimates the sensor information obtainment time for each of the pieces of sensor information included in the second response information, based on the plurality of elapsed times De included in the second response information. Then, the controller 310 associates each of the pieces of sensor information included in the second response information with the sensor information obtainment estimated time of the sensor information, and stores the information and the time in the storage 320. Then, the controller 310 updates the approximate expression based on a plurality of sensor information-time combinations currently stored in the storage 320. Then, the controller 310 estimates the sensor information obtained by the sensor unit 20 at a predetermined time, using the updated approximate expression.

As such, when the second communication apparatus 12 obtains the sensor information a plurality of times between two consecutive obtainment wish timings, the processing apparatus 30 can update the approximate expression based on a plurality of pieces of sensor information recently obtained in each of unit sensor processing periods. This can improve the accuracy of the approximate expression. This can also improve the accuracy of estimating the sensor information obtained by the sensor unit 20 at a predetermined time.

Figure 19:
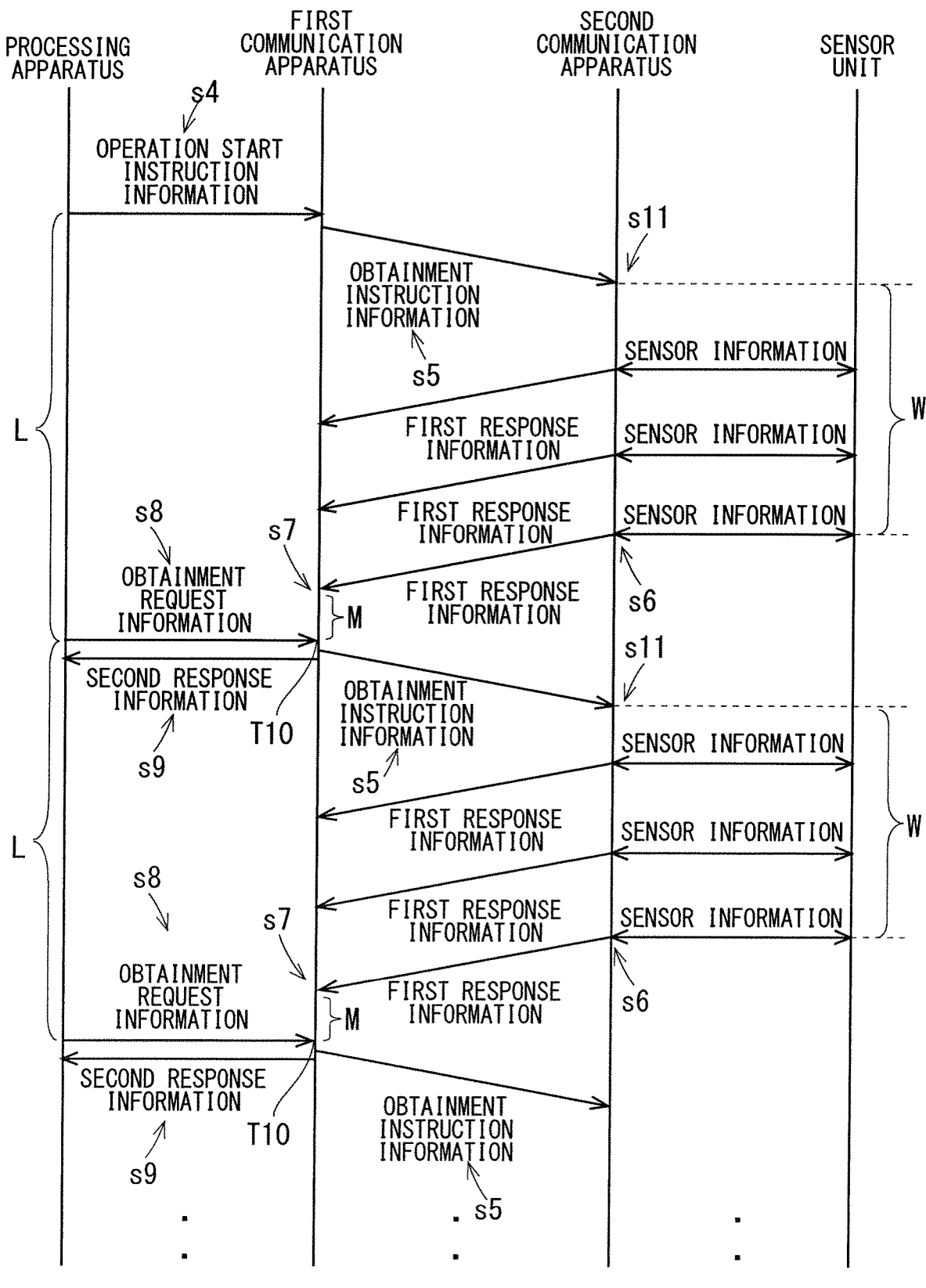
FIG. 19 schematically illustrates example operations of the processing system.

Although the second communication apparatus 12 collectively transmits, to the first communication apparatus 11, the pieces of sensor information obtained between two consecutive obtainment wish timings in the example above, the second communication apparatus 12 may transmit the pieces of sensor information one by one to the first communication apparatus 11. FIG. 19 schematically illustrates example operations of the processing system 1 in this case.

In the example of FIG. 19, the second communication apparatus 12 executes the obtainment/transmission procedure of obtaining the sensor information and transmitting the sensor information to the first communication apparatus 11 at least once in addition to Step s6, while the first communication apparatus 11 receives the obtainment request information two consecutive times. In other words, the second communication apparatus 12 executes the obtainment/transmission procedure of obtaining the sensor information and transmitting the sensor information to the first communication apparatus 11 with a plurality of different timings, between two consecutive obtainment wish timings. The second communication apparatus 12 transmits the first response information to the first communication apparatus 11 with a plurality of different timings. FIG. 19 schematically illustrates that the second communication apparatus 12 executes the obtainment/transmission procedure three times while the first communication apparatus 11 receives the obtainment request information two consecutive times.

In this example, the second communication apparatus 12 starts the obtainment/transmission procedure with the timing to obtain the sensor information identified by the parameter information E. For example, suppose a case where the number of obtainment times E2=3 and the obtainment intervals E1=1. Here, the second communication apparatus 12 performs the obtainment/transmission procedure twice in addition to the obtainment/transmission procedure in Step s6. In addition to executing Step s6, the second communication apparatus 12 starts the obtainment/transmission procedure 1 ms before the obtainment/transmission procedure start timing of the obtainment/transmission procedure in Step s6 and further starts the obtainment/transmission procedure 1 ms before the previous start. As another example, suppose a case where the obtainment intervals E1=0 and the number of obtainment times E2=3. Here, the second communication apparatus 12 executes the obtainment/transmission procedure three times at intervals of a value obtained by dividing the wait time W by 3 (i.e., the W/3 time). The second communication apparatus 12 executes the obtainment/transmission procedure in Step s6 as once in the three times. In addition to the obtainment/transmission procedure in Step s6, the second communication apparatus 12 starts the obtainment/transmission procedure the W/3 time before the obtainment/transmission procedure start timing of the obtainment/transmission procedure in Step s6, and further starts the obtainment/transmission procedure the W/3 time before the previous start.

The first response information to be transmitted in each of the obtainment/transmission procedures includes sensor-information obtainment time information of the sensor information included in the first response information. Each time receiving the first response information, the first communication apparatus 11 finds the elapsed time De on the sensor information included in the first response information. Upon receipt of the obtainment request information, the first communication apparatus 11 transmits, to the processing apparatus 30, the second response information including pieces of sensor information received after receiving the previous obtainment request information and elapsed times De on the pieces of sensor information.

Upon receipt of the second response information, the processing apparatus 30 operates in the same manner as that in the example in FIG. 17. The controller 310 estimates the sensor information obtainment time for each of the pieces of sensor information included in the second response information, based on the plurality of elapsed times De included in the second response information. Then, the controller 310 associates each of the pieces of sensor information included in the second response information with the sensor information obtainment estimated time of the sensor information, and stores the information and the time in the storage 320. Then, the controller 310 updates the approximate expression based on a plurality of sensor information-time combinations currently stored in the storage 320. Then, the controller 310 estimates the sensor information obtained by the sensor unit 20 at a predetermined time, using the updated approximate expression.

Even when the second communication apparatus 12 executes the obtainment/transmission procedure with a plurality of different timings, between two consecutive obtainment wish timings as in the example of FIG. 19, the processing apparatus 30 updates the approximate expression based on a plurality of pieces of sensor information recently obtained in each of unit sensor processing periods. This can improve the accuracy of the approximate expression.

Figure 20:
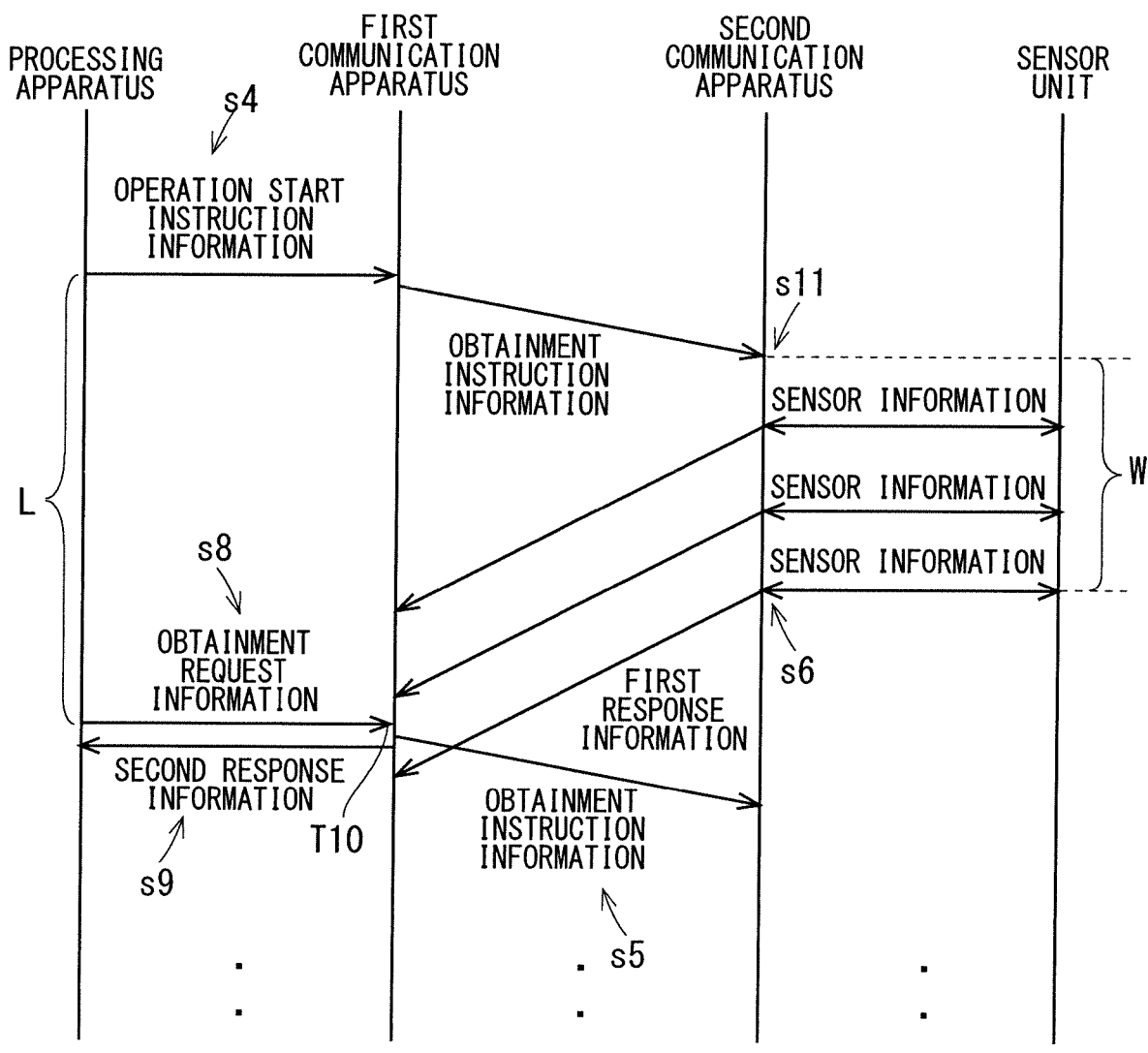
FIG. 20 schematically illustrates example operations of the processing system.

When the uplink communication time Du is longer and variations in the uplink communication times Du are larger, there is a possibility that the first communication apparatus 11 receives a part of E2 pieces of the sensor information to be transmitted by the second communication apparatus 12 during the unit sensor processing period, after the obtainment request reception timing T10. FIG. 20 schematically illustrates an example of the state. In the example of FIG. 20, the first communication apparatus 11 receives the sensor information transmitted last (i.e., the sensor information transmitted in Step s6) among the three pieces of sensor information transmitted by the second communication apparatus 12 during the unit sensor processing period, after the obtainment request reception timing T10 (i.e., the obtainment wish timing). In other words, in the example of FIG. 20, the first communication apparatus 11 receives the first response information transmitted last among the three pieces of first response information transmitted by the second communication apparatus 12 during the unit sensor processing period, after the obtainment request reception timing T10 (i.e., the obtainment wish timing). In such a case, when the first communication apparatus 11 transmits the second response information after receiving all E2 pieces of the first response information, there is a possibility that the processing apparatus 30 waits for a long time until receiving the second response information from the obtainment wish timing.

Here, upon receipt of the obtainment request information, the first communication apparatus 11 may transmit, to the processing apparatus 30, the sensor information received earlier than the reception timing T10 of the obtainment request information among the E2 pieces of the sensor information to be transmitted by the second communication apparatus 12 during the unit sensor processing period. In other words, the first communication apparatus 11 may transmit, to the processing apparatus 30 in response to the obtainment wish timing, the sensor information received earlier than the obtainment wish timing among the E2 pieces of the sensor information to be transmitted by the second communication apparatus 12 during the unit sensor processing period. In the example of FIG. 20, upon receipt of the obtainment request information, the first communication apparatus 11 may transmit, to the processing apparatus 30, the second response information including two pieces of sensor information received earlier than the reception timing T10 of the obtainment request information among the three pieces of the sensor information. This enables the processing apparatus 30 to receive the second response information immediately upon arrival of the obtainment wish timing, and reduces the wait time in the processing apparatus 30. Since the processing apparatus 30 can update the approximate expression using the latest pieces of sensor information included in the received second response information, the accuracy of the approximate expression is improved.

The processing apparatus 30 need not transmit the obtainment request information. Here, the setting information includes sensor information obtainment wish intervals (i.e., intervals at which the processing apparatus 30 wishes to obtain the sensor information) as a replacement for the obtainment request transmission intervals L. The first communication apparatus 11 estimates the obtainment wish timing with which the processing apparatus 30 wishes to obtain the sensor information, based on the sensor information obtainment wish intervals included in the setting information. For example, the controller 111 of the first communication apparatus 11 determines, to be the first obtainment wish timing, the timing with which the sensor information obtainment wish interval has elapsed since the reception time of the operation start instruction information. Then, the controller 111 determines, to be the (X+1)-th obtainment wish timing, the timing with which the sensor information obtainment wish interval has elapsed since the X-th obtainment wish timing, where X is an integer greater than or equal to 1. This enables the first communication apparatus 11 to estimate the obtainment wish timing that repeatedly appears. Not only upon receipt of the operation start instruction information but also upon arrival of the obtainment wish timing, the first communication apparatus 11 transmits the obtainment instruction information to the second communication apparatus 12. The second communication apparatus 12 determines the obtainment/transmission procedure start timing using the sensor information obtainment wish intervals included in the setting information as a replacement for the obtainment request transmission intervals L. Upon arrival of the obtainment wish timing, the first communication apparatus 11 transmits the sensor information received from the second communication apparatus 12 to the processing apparatus 30. In other words, the first communication apparatus 11 transmits the sensor information to the processing apparatus 30 with the estimated obtainment wish timing.

Global Positioning System (GPS) receivers that measure the time may be used instead of the timer 115 of the first communication apparatus 11 and the timer 125 of the second communication apparatus 12. This can omit the synchronization procedure in the initial setting.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Although the processing system and the communication system are described in detail as above, the foregoing description is in all aspects illustrative and does not restrict this disclosure. The various examples described above are applicable in combination unless any contradiction occurs. Therefore, numerous modifications and variations that have not yet been exemplified are devised without departing from the scope of this disclosure.

The present disclosure includes the following aspects.

A communication system according to a first aspect includes: a first communication apparatus configured to communicate with a processing apparatus; and a second communication apparatus configured to perform an obtainment/transmission procedure of obtaining sensor information from a sensor unit and transmitting the sensor information to the first communication apparatus, the sensor unit including at least one sensor, wherein the first communication apparatus transmits the sensor information from the second communication apparatus to the processing apparatus, in response to an obtainment wish timing with which the processing apparatus wishes to obtain the sensor information, and the second communication apparatus determines a start timing to start the obtainment/transmission procedure, based on a first time required to communicate between the first communication apparatus and the second communication apparatus when the second communication apparatus transmits the sensor information to the first communication apparatus.

A communication system according to a second aspect is the communication system according to the first aspect, wherein the processing apparatus transmits, to the first communication apparatus, obtainment request information indicating a request for obtaining the sensor information, and the first communication apparatus transmits the sensor information to the processing apparatus using a timing with which the first communication apparatus receives the obtainment request information as the obtainment wish timing.

A communication system according to a third aspect is the communication system according to the first aspect or the second aspect, wherein the second communication apparatus determines the start timing, based on a data volume of the sensor information.

A communication system according to a fourth aspect is the communication system according to one of the first aspect to the third aspect, wherein the second communication apparatus determines the start timing, based on an operation state of the second communication apparatus.

A communication system according to a fifth aspect is the communication system according to the fourth aspect, wherein the second communication apparatus includes a controller configured to control an operation of the second communication apparatus, and the at least one operation state includes a congestion degree of processes in the controller.

A communication system according to a sixth aspect is the communication system according to the fourth aspect or the fifth aspect, wherein the at least one operation state includes a congestion degree of a bus in the second communication apparatus.

A communication system according to a seventh aspect is the communication system according to one of the first aspect to the third aspect, wherein the second communication apparatus determines the start timing, based on an operation state of the first communication apparatus.

A communication system according to an eighth aspect is the communication system according to the seventh aspect, wherein the first communication apparatus includes a controller configured to control an operation of the first communication apparatus, and the at least one operation state includes a congestion degree of processes in the controller.

A communication system according to a ninth aspect is the communication system according to the seventh aspect or the eighth aspect, wherein the at least one operation state includes a congestion degree of a bus in the first communication apparatus.

A communication system according to a tenth aspect is the communication system according to one of the first aspect to the ninth aspect, wherein the second communication apparatus determines the start timing, based on an actual measured value of the first time.

A communication system according to an eleventh aspect is the communication system according to one of the first aspect to the ninth aspect, wherein the second communication apparatus determines the start timing, based on a degree of variations in the first time.

A communication system according to a twelfth aspect is the communication system according to the eleventh aspect, wherein the second communication apparatus determines the start timing, based on a degree of variations in an actual measured value of the first time.

A communication system according to a thirteenth aspect is the communication system according to one of the first aspect to the twelfth aspect, wherein the obtainment wish timing arrives a plurality of times, and the second communication apparatus obtains the sensor information a plurality of times and transmits pieces of the sensor information to the first communication apparatus, between two consecutive obtainment wish timings.

A communication system according to a fourteenth aspect is the communication system according to the thirteenth aspect, wherein the second communication apparatus collectively transmits, to the first communication apparatus, the obtained pieces of the sensor information.

A communication system according to a fifteenth aspect is the communication system according to the thirteenth aspect, wherein the second communication apparatus executes, between the two consecutive obtainment wish timings, the obtainment/transmission procedure with a plurality of different timings.

A communication system according to a sixteenth aspect is the communication system according to the fifteenth aspect, wherein when the obtainment wish timing arrives, the first communication apparatus transmits, to the processing apparatus in response to the obtainment wish timing, at least one sensor information received earlier than the obtainment wish timing among the pieces of the sensor information transmitted in a plurality of obtainment/transmission procedures.

A communication system according to a seventeenth aspect is the communication system according to one of the first aspect to the sixteenth aspect, wherein in the case where the first communication apparatus has not received the sensor information from the second communication apparatus yet when the obtainment wish timing arrives, the first communication apparatus makes a notification to the processing apparatus.

A communication system according to an eighteenth aspect is the communication system according to one of the first aspect to the sixteenth aspect, wherein in the case where the first communication apparatus has not received the sensor information from the second communication apparatus yet when the obtainment wish timing arrives, the first communication apparatus transmits the sensor information to the processing apparatus upon receipt of the sensor information from the obtainment wish timing to a second time, and the first communication apparatus makes a notification to the processing apparatus when the first communication apparatus does not receive the sensor information during the second time.

A communication system according to a nineteenth aspect is the communication system according to one of the first aspect to the eighteenth aspect, wherein the first communication apparatus and the second communication apparatus perform power-line communication with each other.

A first communication apparatus according to a twentieth aspect is the first communication apparatus included in the communication system according to one of the first aspect to the nineteenth aspect.

A second communication apparatus according to a twenty-first aspect is the second communication apparatus included in the communication system according to one of the first aspect to the nineteenth aspect.

A processing system according to a twenty-second aspect includes: the communication system according to one of the first aspect to the nineteenth aspect; and a processing apparatus configured to receive the sensor information from the communication system.

A processing system according to a twenty-third aspect is the processing system according to the twenty-second aspect, wherein the processing apparatus controls an actuator based on the sensor information received from the communication system.

A processing system according to a twenty-fourth aspect is the processing system according to the twenty-second aspect or the twenty-third aspect, wherein the obtainment wish timing arrives a plurality of times, the first communication apparatus transmits the sensor information, and an elapsed time from a time at which the first communication apparatus has obtained the sensor information to a time at which the first communication apparatus transmits the sensor information to the processing apparatus or to the obtainment wish timing, to the processing apparatus in response to the obtainment wish timing, and the processing apparatus estimates the sensor information obtained at a predetermined time by the sensor unit, based on the sensor information and the elapsed time that are transmitted from the first communication apparatus a plurality of times.

A processing apparatus according to a twenty-fifth aspect is the processing apparatus included in the processing system according to the twenty-fourth aspect.

What is claimed is:

1. A communication system, comprising:
   a first communication apparatus configured to communicate with a processing apparatus; and
   a second communication apparatus configured to obtain sensor information from a sensor apparatus and transmit the sensor information to the first communication apparatus, the sensor apparatus including at least one sensor in response to an instruction from the first communication apparatus,
   wherein the first communication apparatus transmits the sensor information from the second communication apparatus to the processing apparatus, in response to an obtainment wish timing with which a request from the processing apparatus for the sensor information,
   the second communication apparatus determines a start timing to obtain the sensor information from the sensor, wherein the start timing includes a wait time from receipt of the instruction from the first communication apparatus based on a first time required for the second communication apparatus to transmit the sensor information to the first communication apparatus, wherein the second communication apparatus determines the start timing based on an operation state of the second communication apparatus,
wherein the second communication apparatus includes at least one processor configured to control an operation of the second communication apparatus, and
the operation state includes a congestion degree of processes in the at least one processor.

2. The communication system according to claim 1,
wherein the processing apparatus transmits, to the first communication apparatus, a request for obtaining the sensor information, and
the first communication apparatus transmits the sensor information to the processing apparatus using a timing with which the first communication apparatus receives the request as the obtainment wish timing.

3. The communication system according to claim 1,
wherein the second communication apparatus determines the start timing based on a data volume of the sensor information.

4. The communication system according to claim 1,
wherein the operation state includes a congestion degree of a bus in the second communication apparatus.

5. The communication system according to claim 1,
wherein the second communication apparatus determines the start timing based on actual measured values of the first time.

6. The communication system according to claim 1,
wherein the second communication apparatus determines the start timing based on a degree of variations in the first time.

7. The communication system according to claim 6,
wherein the second communication apparatus determines the start timing based on a degree of variations in an actual measured value of the first time.

8. A communication system, comprising:
a first communication apparatus configured to communicate with a processing apparatus; and
a second communication apparatus configured to obtain sensor information from a sensor apparatus and transmit the sensor information to the first communication apparatus, the sensor apparatus including at least one sensor in response to an instruction from the first communication apparatus,
wherein the first communication apparatus transmits the sensor information from the second communication apparatus to the processing apparatus, in response to an obtainment wish timing with which a request from the processing apparatus for the sensor information,
the second communication apparatus determines a start timing to obtain the sensor information from the sensor, wherein the start timing includes a wait time from receipt of the instruction from the first communication apparatus based on a first time required for the second communication apparatus to transmit the sensor information to the first communication apparatus,
wherein the obtainment wish timing arrives a plurality of times, and
the second communication apparatus obtains the sensor information a plurality of times and transmits pieces of the sensor information to the first communication apparatus, between two consecutive obtainment wish timings.

9. The communication system according to claim 8,
wherein the second communication apparatus collectively transmits, to the first communication apparatus, the obtained pieces of the sensor information.

10. The communication system according to claim 8,
wherein the second communication apparatus executes, between the two consecutive obtainment wish timings obtaining and transmitting the sensor information with a plurality of different timings.

11. The communication system according to claim 10,
wherein when the obtainment wish timing arrives, the first communication apparatus transmits, to the processing apparatus in response to the obtainment wish timing, at least one sensor information received earlier than the obtainment wish timing among the pieces of the sensor information transmitted from the second communication apparatus.

12. The communication system according to claim 1,
wherein in the case where the first communication apparatus has not received the sensor information from the second communication apparatus yet when the obtainment wish timing arrives, the first communication apparatus makes a notification to the processing apparatus.

13. The communication system according to claim 1,
wherein in the case where the first communication apparatus has not received the sensor information from the second communication apparatus yet when the obtainment wish timing arrives,
the first communication apparatus transmits the sensor information to the processing apparatus when the first communication apparatus receives the sensor information during a second time from the obtainment wish timing, and
the first communication apparatus makes a notification to the processing apparatus when the first communication apparatus does not receive the sensor information during the second time.

14. The communication system according to claim 1,
wherein the first communication apparatus and the second communication apparatus perform power-line communication with each other.

15. The first communication apparatus included in the communication system according to claim 1.

16. The second communication apparatus included in the communication system according to claim 1.

17. A processing system, comprising:
the communication system according to claim 1; and
a processing apparatus configured to receive the sensor information from the communication system.

18. The processing system according to claim 17,
wherein the processing apparatus controls an actuator based on the sensor information received from the communication system.

19. The processing system according to claim 17,
wherein the obtainment wish timing arrives a plurality of times,
the first communication apparatus transmits the sensor information, and an elapsed time from a time at which the first communication apparatus has obtained the sensor information to a time at which the first communication apparatus transmits the sensor information to the processing apparatus or to the obtainment wish timing, to the processing apparatus in response to the obtainment wish timing, and
the processing apparatus estimates the sensor information obtained at a predetermined time by the sensor apparatus, based on the sensor information and the elapsed time that are transmitted from the first communication apparatus a plurality of times.

20. The processing apparatus included in the processing system according to claim 19.

21. A communication system, comprising:
a first communication apparatus configured to communicate with a processing apparatus; and
a second communication apparatus configured to obtain sensor information from a sensor apparatus and transmit the sensor information to the first communication apparatus, the sensor apparatus including at least one sensor in response to an instruction from the first communication apparatus,
wherein the first communication apparatus transmits the sensor information from the second communication apparatus to the processing apparatus, in response to an obtainment wish timing with which a request from the processing apparatus for the sensor information,
the second communication apparatus determines a start timing to obtain the sensor information from the sensor, wherein the start timing includes a wait time from receipt of the instruction from the first communication apparatus based on a first time required for the second communication apparatus to transmit the sensor information to the first communication apparatus,
wherein the second communication apparatus determines the start timing based on an operation state of the first communication,
wherein the first communication apparatus includes at least one processor configured to control an operation of the first communication apparatus, and
the operation state includes a congestion degree of processes in the at least one processor.

22. The communication system according to claim 21,
wherein the operation state includes a congestion degree of a bus in the first communication apparatus.

* * * * *